(12) United States Patent
Umezu et al.

(10) Patent No.: US 8,120,865 B2
(45) Date of Patent: Feb. 21, 2012

(54) IMAGE DEGRADATION PREVENTION OPTICAL APPARATUS

(75) Inventors: Takuji Umezu, Utsunomiya (JP); Harunobu Ichinose, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 11/745,182

(22) Filed: May 7, 2007

(65) Prior Publication Data

US 2008/0037092 A1    Feb. 14, 2008

(30) Foreign Application Priority Data

May 23, 2006 (JP) .................................. 2006-142514
Jun. 23, 2006 (JP) .................................. 2006-174415

(51) Int. Cl.
*G02B 5/22* (2006.01)
*H04N 9/12* (2006.01)

(52) U.S. Cl. ......... 359/889; 359/890; 359/891; 348/743

(58) Field of Classification Search .................. None
See application file for complete search history.

(56) References Cited

U.S. PATENT DOCUMENTS

| 5,293,542 | A |  | 3/1994 | Ise et al. |
|---|---|---|---|---|
| 5,479,298 | A |  | 12/1995 | Yanagi et al. |
| 6,340,252 | B1 |  | 1/2002 | Kawano |
| 6,771,315 | B1 | * | 8/2004 | Nanjo et al. .................. 348/362 |
| 7,365,791 | B2 |  | 4/2008 | Ikeda |
| 2004/0240068 | A1 | * | 12/2004 | Namazue et al. ............. 359/589 |
| 2005/0163501 | A1 | * | 7/2005 | Miyakawa .................... 396/450 |

FOREIGN PATENT DOCUMENTS

| EP | 1 582 900 | 10/2005 |
|---|---|---|
| JP | 08-248472 | 9/1996 |
| JP | 2000-214514 A | 8/2000 |
| JP | 2002-055374 | 2/2002 |
| JP | 2003-315871 A | 11/2003 |
| JP | 2004-072580 A | 3/2004 |
| JP | 2004-101956 A | 4/2004 |
| JP | 2005-215215 A | 8/2005 |

OTHER PUBLICATIONS

Communication from EPO dated Sep. 26, 2007 with European Search Report for Application No. 07009727.4-2209.

* cited by examiner

*Primary Examiner* — Jade R Chwasz
(74) *Attorney, Agent, or Firm* — Rossi, Kimms & McDowell LLP

(57) ABSTRACT

An optical apparatus which is capable of preventing degradation of image quality caused by an ND filter. The optical apparatus incorporates an aperture stop having an aperture variable in size, and an ND filter movable with respect to the aperture of the aperture stop, an actuator that drives the ND filter, and a controller that controls the actuator. The ND filter includes a part having a size that can fully cover a first aperture that is the aperture with the aperture stop being narrowed. The controller controls the actuator so that the ND filter is moved without a halt between a first position where the part is retracted with respect to the first aperture with the aperture stop being narrowed, and a second position where the part fully covers the first aperture in any stop operation.

10 Claims, 16 Drawing Sheets

IMAGE DEGRADATION PREVENTION OPTICAL APPARATUS

BACKGROUND OF THE INVENTION

The present invention relates to an optical apparatus including an aperture stop mechanism and an ND (neutral density) filter such as a video camera and a digital camera.

A light amount adjustment device included in an optical apparatus changes the area of a stop aperture using a plurality of stop blades to adjust the amount of light reaching an image-pickup element and obtain a proper exposure amount.

In order to prevent degradation of optical performance caused by so-called small aperture diffraction, the light amount adjustment device prevents the area of the stop aperture from being smaller than a certain small aperture, and sets a proper light amount in image pickup of a high brightness object using an ND filter covering the small aperture (see Japanese Patent Laid-Open No. 2002-55374).

However, in the conventional light amount adjustment device including the ND filter, the position of the ND filter is sometimes controlled so that the ND filter enters a state of covering only part of the small aperture, a so-called semi-covering state.

In such a semi-covering state, an opening (an uncovered opening) smaller than the small aperture is formed that is surrounded by a tip of the ND filter and an edge of the small aperture, and this small opening may cause small aperture diffraction. Thus, the ND filter cannot sufficiently prevent degradation of image quality caused by the small aperture diffraction.

Also, the ND filter is produced by vapor-depositing a film. In the semi-covering state, a step (a difference in optical path length) by a thickness of the board occurs on a transmission wavefront, thereby causing degradation of image quality.

Further, in order to reduce the size of the optical apparatus, a horizontal linear tip of the ND filter may be held in a position entering a full stop aperture. In this case, the tip of the ND filter exists in the stop aperture until the full stop aperture is narrowed down to some extent.

When a conventional CCD sensor is used as an image-pickup element and for example, a high brightness object in the form of a point light source exists in an image-pickup region, vertical smear occurs and the beam of light is generated by diffraction in a direction of an inclination angle of a linear portion of a stop blade that forms a stop aperture. Such smear and the beam of light can be prevented by using a smearless sensor such as a CMOS sensor as an image-pickup element.

However, as described above, when the horizontal linear tip of the ND filter enters the stop aperture, diffraction at the tip generates the beam of light in a vertical direction and degrades image quality even using a smearless image-pickup element.

BRIEF SUMMARY OF THE INVENTION

The present invention provides an optical apparatus capable of prevent degradation of image quality caused by an ND filter.

As an aspect, the present invention provides an optical apparatus which includes an aperture stop having an aperture variable in size, and an ND filter movable with respect to the aperture of the aperture stop, an actuator that drives the ND filter, and a controller that controls the actuator. The ND filter includes a part having a size that can fully cover a first aperture that is the aperture with the aperture stop being narrowed, and the controller controls the actuator so that the ND filter is moved without a halt between a first position where the part is retracted from the first aperture and a second position where the part fully covers the first aperture in any stop operation.

As another aspect, the present invention provides an optical apparatus which includes an aperture stop having an aperture variable in size, and an ND filter movable with respect to the aperture of the aperture stop. When a movement direction of the ND filter for covering the aperture is a first direction, and a direction parallel to light entrance/emergence surfaces of the ND filter and perpendicular to the first direction is a second direction, a tip of the ND filter in the first direction has a shape different from a linear shape extending in the second direction.

As yet another aspect, the present invention provides an optical apparatus which includes an aperture stop having an aperture variable in size; and an ND filter movable with respect to the aperture of the aperture stop. When a movement direction of the ND filter for covering the aperture is a first direction, and a direction parallel to a scanning direction of an image-pickup element that converts an optical image formed by light having passed through the aperture of the aperture stop into an electrical signal is a second direction, a tip of the ND filter in the first direction has a shape different from a linear shape extending in the second direction.

Further objects and features of the present invention will be become more apparent from the following description of preferred embodiments with reference to the drawings.

DETAILED DESCRIPTION OF THE PREFERRED EMBODIMENTS

Now, preferred embodiments of the present invention will be described with reference to the drawings.

Embodiment 1

Figure 1:
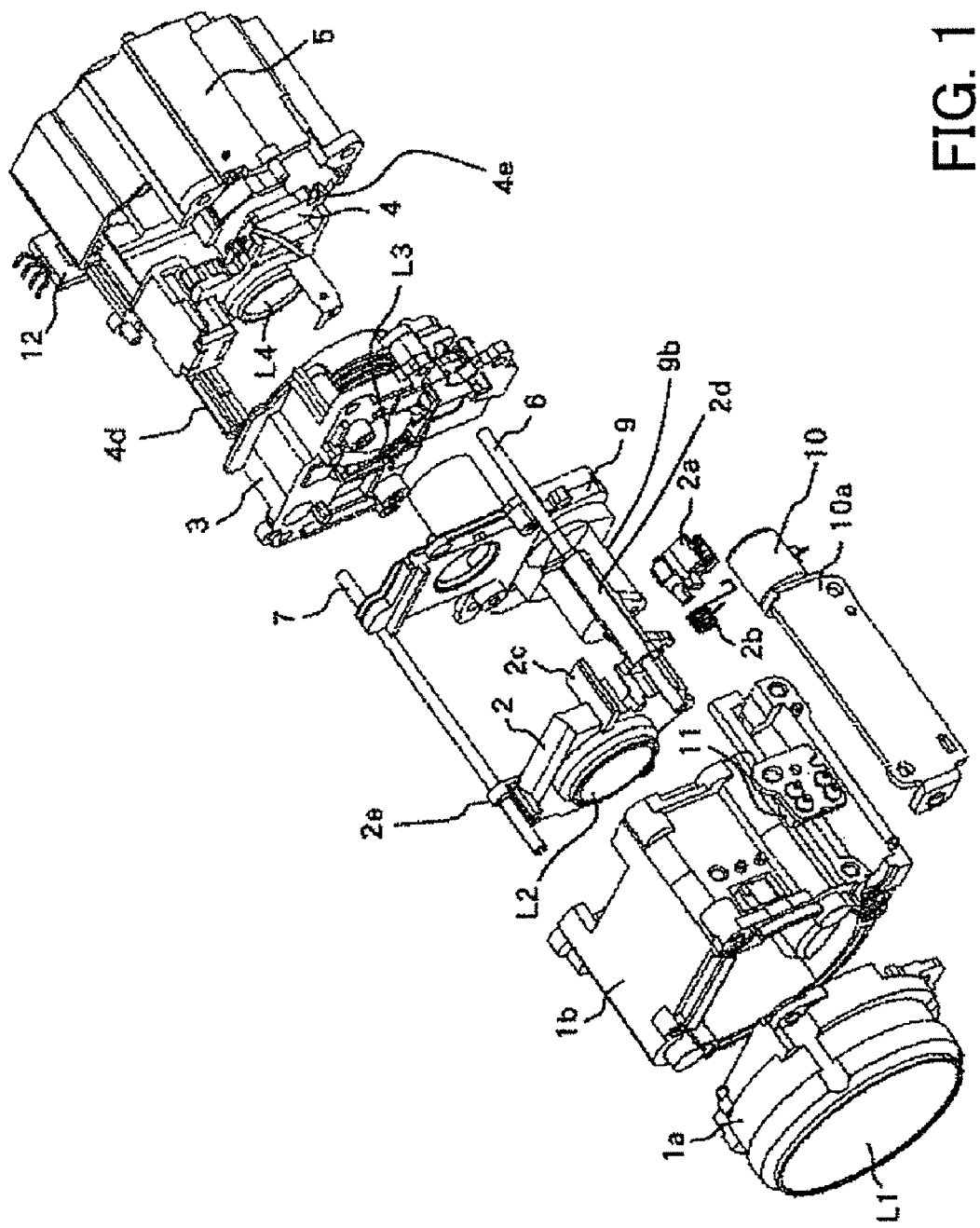
FIG. 1 is an exploded perspective view of a configuration of a lens barrel portion of a video camera that is Embodiment 1 of the present invention.
Figure 2:
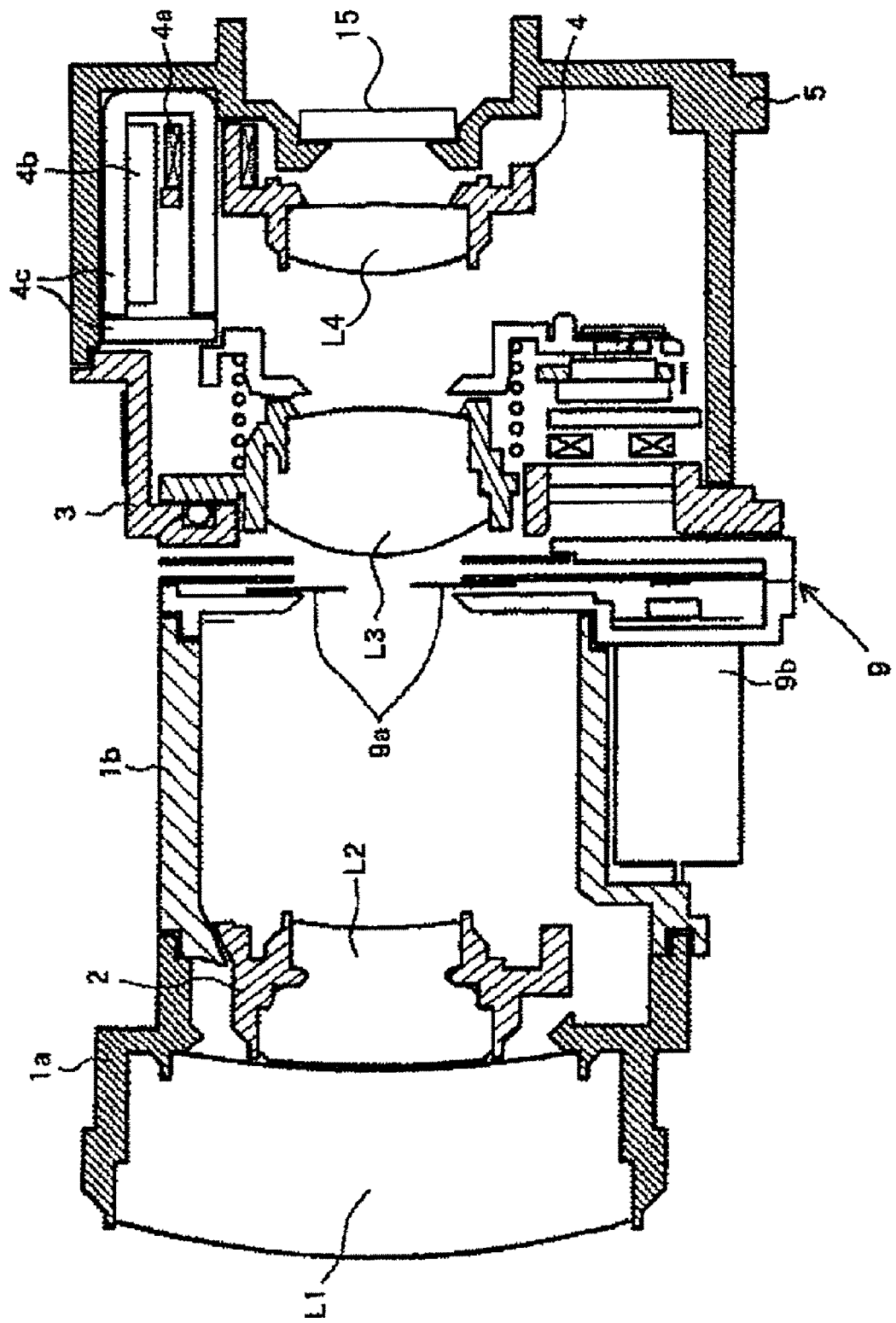
FIG. 2 is a sectional view of the configuration of the lens barrel portion of Embodiment 1.

FIGS. 1 and 2 show the configuration of a lens barrel portion of a video camera (an optical apparatus) that is Embodiment 1 of the present invention.

The lens barrel portion includes a variable magnification optical system as an image-pickup optical system constituted by four lens units: convex, concave, convex and convex lens units in the order from an object side. In the descriptions below, the object side is sometimes referred to as a front side, and an image-pickup element side as a rear side.

In these drawings, in the order from the object side (the left side in the drawings), L1 denotes a stationary first lens unit, and L2 denotes a second lens unit that is moved in a direction of an optical axis for varying magnification. L3 denotes a third lens unit that is moved perpendicularly to the optical axis for image stabilization, and L4 denotes a fourth lens unit that is moved in the direction of the optical axis for focusing.

Reference numeral 1a denotes a front lens barrel that holds the first lens unit L1, and 1b denotes a stationary lens barrel to which the front lens barrel 1a is secured.

Reference numeral 2 denotes a second movable frame that holds the second lens unit L2, and reference numeral 3 denotes a shifting unit that holds the third lens unit L3 movably perpendicularly to the optical axis.

Reference numeral 4 denotes a fourth movable frame that holds the fourth lens unit L4, and reference numeral 5 denotes a rear lens barrel to which an image-pickup element 15 such as a CCD sensor or a CMOS sensor (see FIG. 2) is mounted that converts an optical image formed by light having passed through a stop aperture into an electrical signal.

Two guide bars 6 and 7 are secured between the stationary lens barrel 1b and the rear lens barrel 5. A sleeve portion 2d provided on the second movable frame 2 movably engages the guide bar 6 and is guided in the direction of the optical axis. A U-shaped groove portion 2e provided in the second movable frame 2 movably engages the guide bar 7 and prevents rotation of the second movable frame 2 around the guide bar 6.

A sleeve portion 4d provided on the fourth movable frame 4 movably engages the guide bar 7 and is guided in the direction of the optical axis. A U-shaped groove portion 4e provided in the fourth movable frame 4 movably engages the guide bar 6 and prevents rotation of the fourth movable frame 4 around the guide bar 7.

The shifting unit 3 is positioned with respect to the rear lens barrel 5, and placed and held between the rear lens barrel 5 and the stationary lens barrel 1b.

Reference numeral 9 denotes a light amount adjustment unit (a light amount adjustment device) that adjusts the amount of light reaching an image-pickup element 15 that converts an optical image formed by light having entered an image-pickup optical system and passed through a stop aperture into an electrical signal. The light amount adjustment unit 9 that can change the size of the stop aperture moves two stop blades 9a in FIG. 2 perpendicularly to the optical axis by a driving force of a stop motor 9b constituted by a stepping motor to change a diameter of the stop aperture. The stop blades 9a and the stop motor 9b constitute an aperture stop.

The light amount adjustment unit 9 also has an ND filter so as to be movable into and out of the optical path independently of the stop blade 9a. The ND filter will be described later. The light amount adjustment unit 9 is secured to the shifting unit 3 from the front by an unshown screw.

The stationary lens barrel 1b is positioned on the rear lens barrel 5, and holds the shifting unit 3 between the stationary lens barrel 1b and the rear lens barrel 5 as described above, and is secured to the rear lens barrel 5 together with the shifting unit 3 from the rear by unshown three screws. The front lens barrel 1a, the stationary lens barrel 1b, and the rear lens barrel 5 constitute a lens barrel body.

Reference numerals 4a, 4b and 4c denote a coil, a drive magnet and a yoke for closing magnetic fluxes, respectively, that constitute a focus driving unit that moves the fourth lens unit L4 (the fourth movable frame 4) in the direction of the optical axis.

When a current is passed through the coil 4a, a Lorentz force is generated between the magnet 4b and the coil 4a by mutual repulsion of magnetic lines of force, and the fourth lens unit L4 is driven in the direction of the optical axis together with the fourth movable frame 4. The fourth movable frame 4 holds an unshown sensor magnet that is multi-pole-magnetized in the direction of the optical axis.

An MR sensor 12 that reads changes of the magnetic lines of force according to movements of the sensor magnet is secured to the rear lens barrel 5. This detects the position of the fourth movable frame 4 (the fourth lens unit L4).

Reference numeral 10 denotes a zoom motor that moves the second lens unit L2 in the direction of the optical axis, and is constituted by a stepping motor. A front end of an output shaft of the zoom motor 10 is rotatably held by a bearing portion formed on the front side of a laterally extended U-shaped holding plate 10a. A rear end of the output shaft is rotatably held by a bearing portion formed on the rear side of the holding plate 10a. A lead screw is formed on the output shaft of the zoom motor 10, and engages a rack 2a mounted to the second movable frame 2. Thus, when the zoom motor 10 is rotated, the engagement between the lead screw and the rack 2a causes the second movable frame 2 to be driven in the direction of the optical axis. A torsion coil spring 2b biases the second movable frame 2 and the guide bars 6 and 7, the second movable frame 2 and the rack 2a, and the rack 2a and the lead screw to prevent backlash therebetween.

Reference numeral 11 denotes a zoom reset switch constituted by a photo interrupter. The zoom reset switch 11 optically detects a movement of a light shielding portion 2c formed in the second movable frame 2 to output an electrical signal. Thus, a CPU described later can determine whether the second movable frame 2 (the second lens unit L2) is in a reference position. The zoom reset switch 11 is secured to the front lens barrel 1 by a screw via a board.

Figure 3:
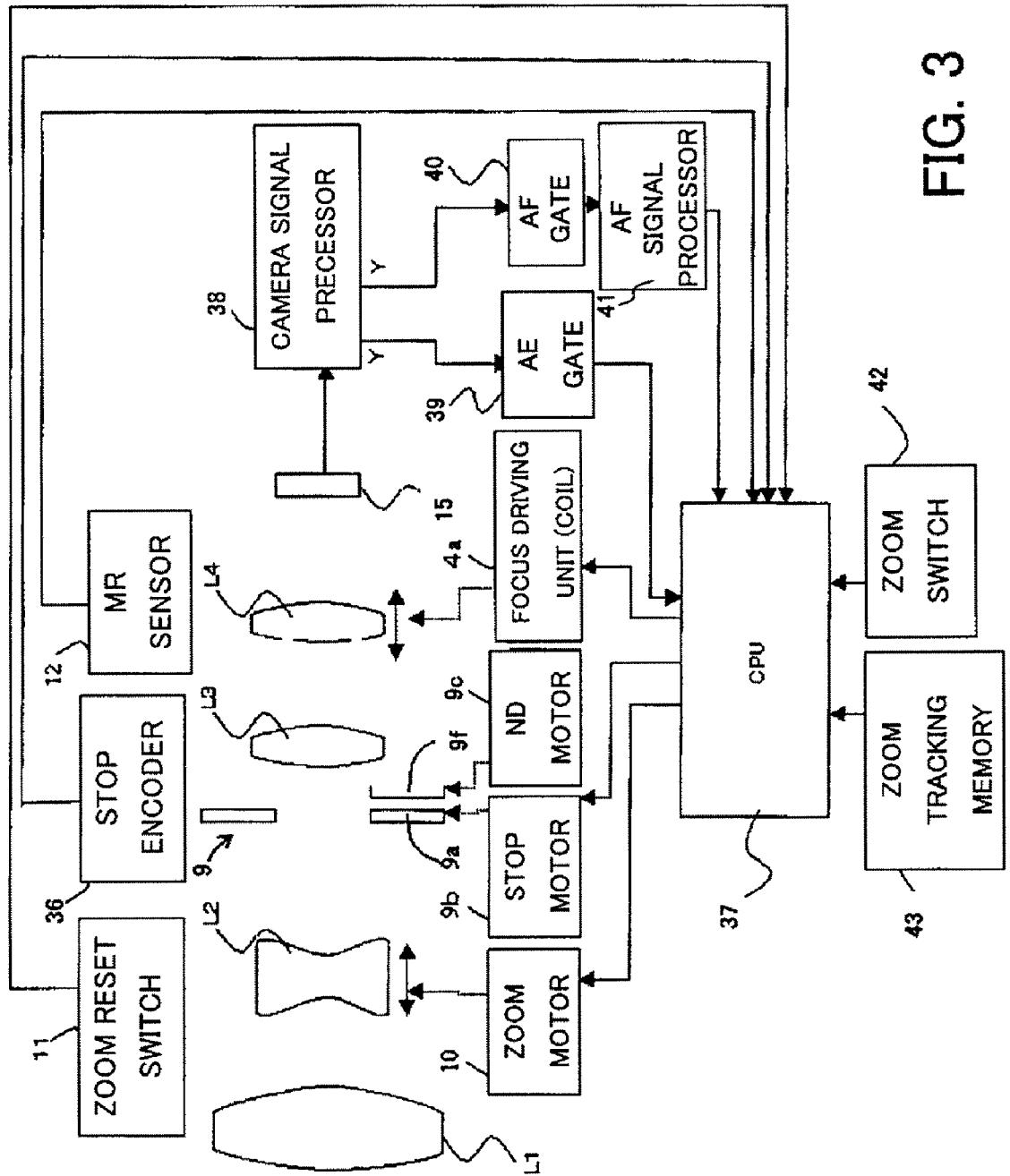
FIG. 3 is a block diagram of an electrical configuration of the video camera of Embodiment 1.

FIG. 3 shows an electrical configuration of the video camera in the embodiment. In FIG. 3, the components of the lens barrel portion described with reference to FIGS. 1 and 2 are denoted by the same reference numerals as in FIGS. 1 and 2, and descriptions thereof will be omitted.

Reference numeral 37 denotes a CPU as a controller that controls the video camera. Reference numeral 38 denotes a camera signal processing circuit that performs predetermined amplification or gamma correction of an output of the image-pickup element 15. An image signal subjected to such predetermined processing is transmitted to an AE gate 39 and an AF gate 40. In each of the AE gate 39 and the AF gate 40, a signal extracting range optimum for exposure determination and focusing is set from an entire image region. The size of each gate may be variable, or a plurality of AE gates 39 and a plurality of AF gates 40 may be provided.

Reference numeral 41 denotes an AF signal processing circuit that generates an AF signal for AF (autofocusing), and generates an AF evaluation value signal for contrast AF based on a high frequency component of the image signal. Reference numeral 42 denotes a zoom switch operated by a photographer, and reference numeral 43 denotes a zoom tracking memory. The zoom tracking memory 43 stores information on the positions of the fourth lens unit L4 to be set according to object distances and the positions of the second lens unit L2 in varying magnification. A memory in the CPU 37 may be used as a zoom tracking memory.

For example, when the photographer operates the zoom switch 42, the CPU 37 drives the zoom motor 10. Concurrently, the CPU 37 controls energization of the focus driving unit (the coil 4a) so that the position of the fourth lens unit L4 matches the position read from the zoom tracking memory 43 according to the position of the second lens unit L2 and the object distance.

In an AF operation, the CPU 37 controls the energization of the focus driving unit so that the AF evaluation value signal from the AF signal processing circuit 41 reaches peak (maximum).

Further, in order to obtain proper exposure, the CPU 37 controls the stop motor 9b as an actuator based on an average value of outputs of a Y signal having passed through the AE gate 39. This controls the diameter of the stop aperture. Reference numeral 36 denotes a stop encoder provided in the light amount adjustment unit 9, which detects the position of the stop blades, that is, the diameter of the stop aperture.

Figure 4:
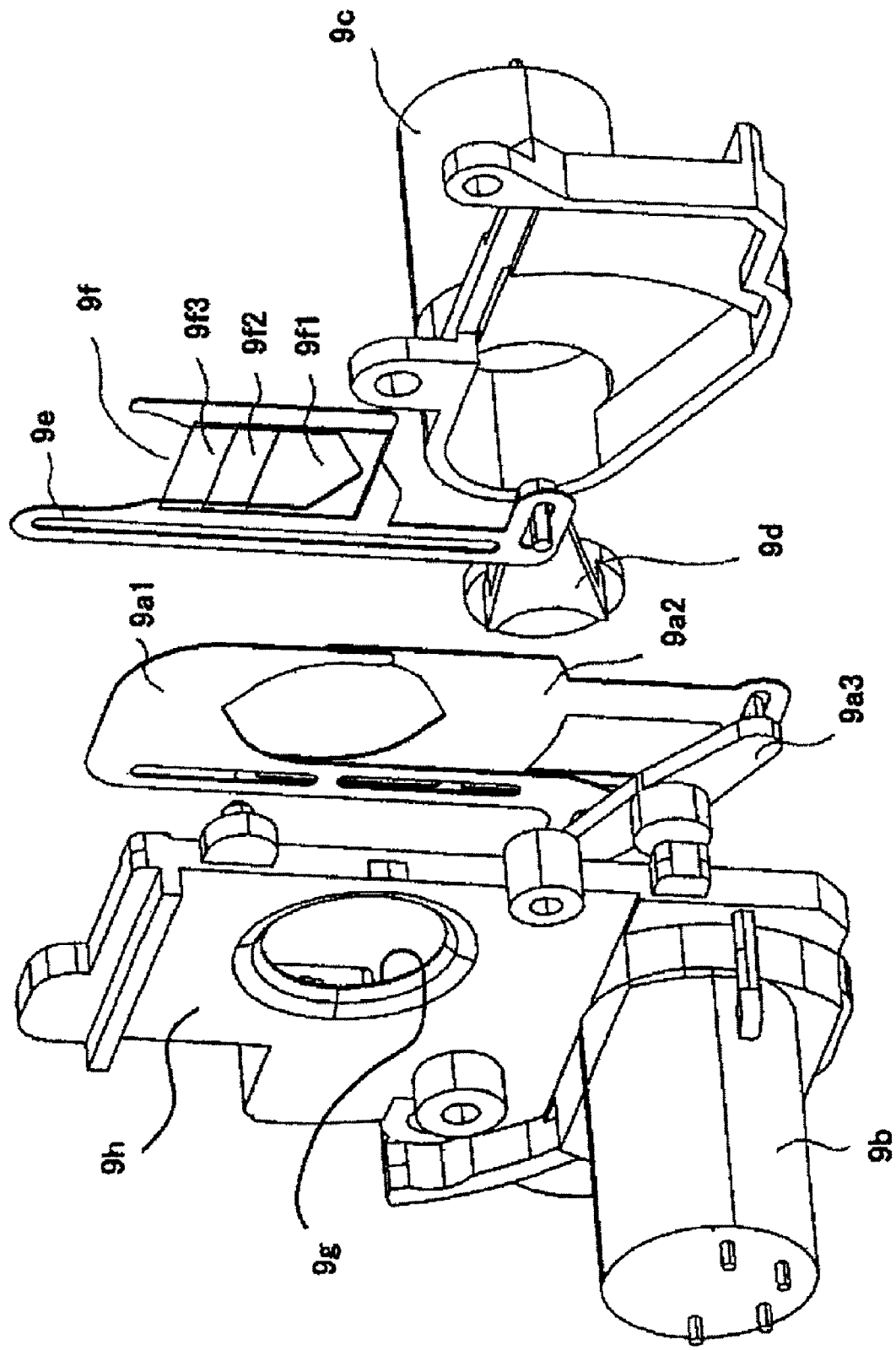
FIG. 4 is an exploded perspective view of a light amount adjustment unit of Embodiment 1.

Next, the light amount adjustment unit 9 will be described in detail with reference to FIG. 4. The light amount adjustment unit 9 that can change the size of the stop aperture includes a stop base plate 9h having a stationary stop aperture 9g, two stop blades 9a1 and 9a2, and a driving lever 9a3 connected to an output shaft of the stop motor 9b and the stop blades 9a1 and 9a2. The stop motor 9b is operated to drive the two stop blades 9a1 and 9a2 in opposite directions, and change the size (diameter) of the stop aperture formed by the stop blades 9a1 and 9a2. Such a light amount adjustment unit 9 is also referred to as a so-called guillotine-type stop.

The light amount adjustment unit 9 includes a gradation ND filter 9f with a transparent portion. The ND filter 9f is mounted to an ND holding plate 9e. Reference numeral 9c denotes an ND motor as an actuator for moving the ND filter 9f (the ND holding plate 9e) into and out of an optical path independently of the stop blades 9a1 and 9a2. An ND driving arm 9d is connected to an output shaft of the ND motor 9c, and to the ND holding plate 9e. Thus, the ND motor 9c as the actuator is operated to drive the ND filter 9f in parallel with a surface of the stop aperture.

The gradation ND filter 9f with a transparent portion has a transparent portion 9/3, a gradated density portion 9/2, and a maximum density portion 9/1 in the order from the tip side in an insertion direction into the optical path. In the embodiment, the transparent portion 9/3 corresponds to a first part, and the gradated density portion 9/2 and the maximum density portion 9/1 correspond to a second part having lower transmittance than the first part.

The ND filter 9f is such that the gradated density portion 9/2 and the maximum density portion 9/1 are formed of vapor-deposited films on parts except a tip on a transparent and colorless plastic board. The tip without a vapor-deposited film is the transparent portion 9/3. The wording "transparent and colorless" herein includes, besides a fully transparent and colorless state, a state where no color change or no brightness change is deemed to occur in the picked-up image when the transparent portion 9/3 is moved in and out of the optical path. Specifically, the transmittance is preferably set within the range of 100% to 75%, and more preferably 100% to 87.5%. In order words, if a part including the transparent portion 9/3 and part of the gradated density portion 9/2 has transmittance of 75% or more, the part corresponds to the first part, though there is described above that "the transparent portion 9/3 corresponds to the first part".

As described later, the transparent portion 9/3 has such a size as to fully cover a stop aperture corresponding to F4.0 as described below.

The maximum density portion 9/1 is set, for example, to a density of ND 1.0. The gradated density portion 9/2 with increasing density (decreasing transmittance) toward the maximum density portion 9/1 is provided between the transparent portion 9/3 and the maximum density portion 9/1, thereby causing differences in density in the stop aperture and preventing degradation of MTF. The difference in density between adjacent density portions in the gradated density portion 9/2 is set to ND 0.3 or less for preventing rapid changes in brightness.

A difference in thickness between a surface of the transparent portion 9/3 and a vapor-deposited film surface with a minimum density of the gradated density portion 9/2, and a difference in thickness between vapor-deposited film surfaces with different densities of the gradated density portion 9/2 and the maximum density portion 9/1 are preferably one third or less of a minimum wavelength at which the image-pickup element 15 has sensitivity. This prevents degradation of MTF caused by the difference in thickness.

The plastic board is formed as one simple flat plate having no step such as a hole for passing light.

Figure 5:
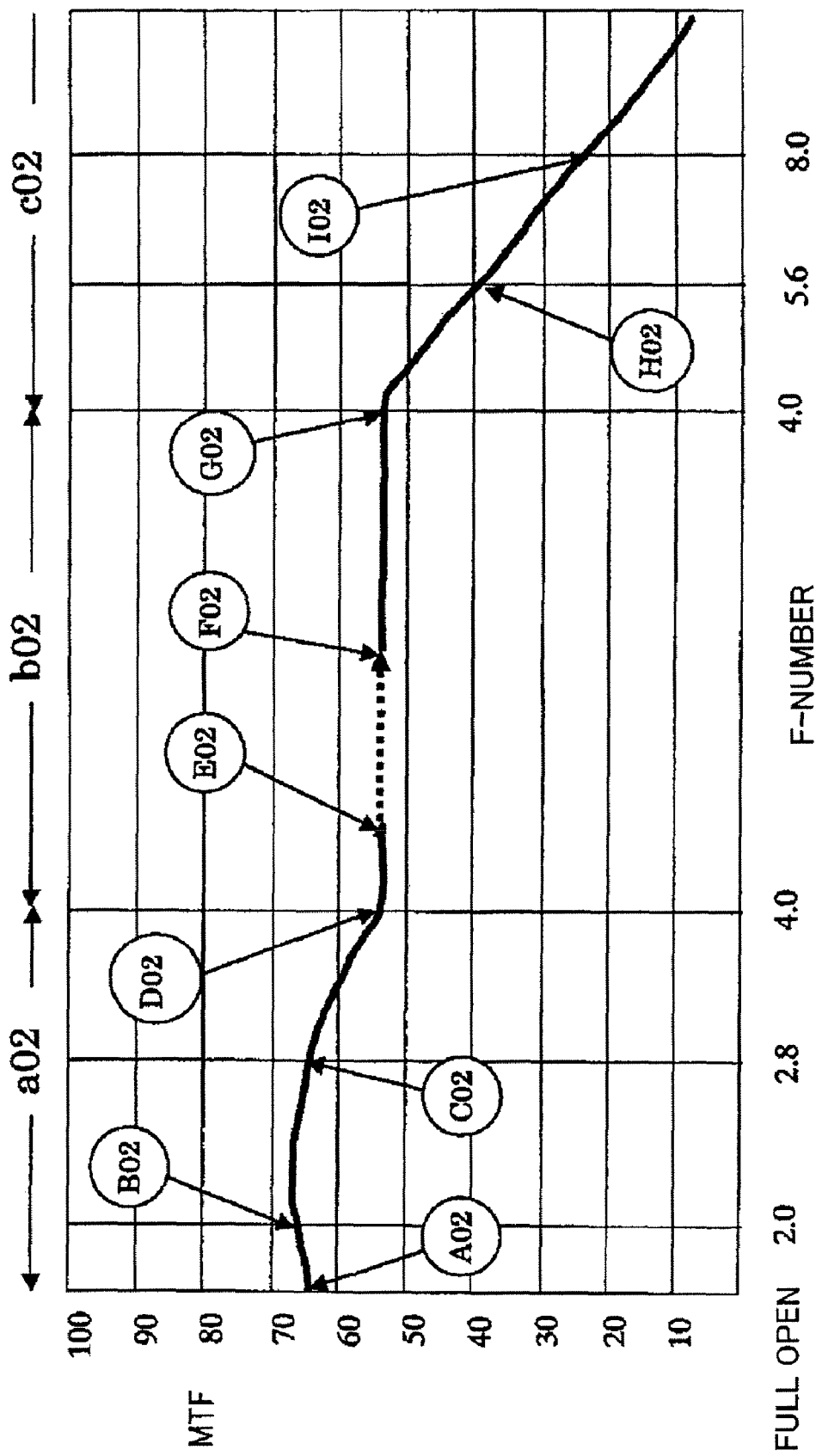
FIG. 5 is a graph showing a relationship between light amount adjustment and MTF by the light amount adjustment unit of Embodiment 1.

Next, a control method of the light amount adjustment unit 9 will be described with reference to FIGS. 5 and 6. FIG. 5 shows a relationship between the transmitted light amount (T-number) of the light amount adjustment unit 9 and MTF (modulation transfer function) of the lens barrel portion. The transmitted light amount is shown as an aperture value (F-number). The same applies to drawings used for descriptions on other embodiments.

The amount of light transmitting the light amount adjustment unit 9 is controlled by a combination of changing the area of the stop aperture which is formed by the two stop blades 9a1 and 9a2 and has a substantially rhombic shape, and changing an insertion state of the ND filter 9f. FIG. 6 shows that the stop aperture and the insertion state of the ND filter 9f are controlled so as to reduce the transmitted light amount of the light amount adjustment unit 9 (viewed in the direction of the optical axis) in the order of positions A02 to I02. The positions A02, B02, . . . , I02 in FIG. 6 correspond to the states denoted by the same reference numerals on the graph in FIG. 5. In the description below, the two stop blades 9a1 and 9a2 are collectively referred to as a stop blade 9a.

The area of the stop aperture is first reduced (the range a02 in FIG. 5) for reducing the transmitted light amount of the light amount adjustment unit 9. Next, the ND filter 9f is inserted (the range b02 in FIG. 5). Then, after the ND filter 9f is fully inserted (fully covers the stop aperture), the area of the stop aperture is again reduced (the range c02 in FIG. 5).

The position A02 shows an open state where the stop blade 9a is retracted outside the stationary stop aperture 9g that is the full stop aperture. In this open state, part of the transparent portion 9f3 of the ND filter 9f covers part of the full stop aperture. The ND filter 9f may be fully retracted outside the full stop aperture.

Then, the stop blade 9a is driven toward the position B02 corresponding to F2.0. This reduces the light amount and increases the MTF. Further, while the stop blade 9a is driven toward the position C02 corresponding to F2.8 and the position D02 corresponding to F4.0, the light amount is reduced and the MTF is gradually reduced.

Then, with the stop aperture fixed at an aperture area corresponding to F4.0 (a first stop aperture), insertion driving of the ND filter 9f is started. The position E02 indicates a state (a first state) immediately before a tip 9f4 of the ND filter 9f in the insertion direction covers part of the stop aperture at F4.0.

The position F02 indicates a state (a second state) where the transparent portion 9f3 fully covers the stop aperture at F4.0 after the insertion of the ND filter 9f is completed. The ND filter 9f is not halted in any (or every) stop operation (that is, irrespective of brightness changes of the object) from the position E02 to the position F02. Specifically, the tip 9f4 of the ND filter 9f is not halted at positions corresponding to the inside of the stop aperture at F4.0 in any stop operation. In FIG. 5, the dotted arrow connecting the position E02 and the position F02 means that the ND filter 9f is controlled to be moved from the position E02 to the position F02 without a halt in any stop operation. The insertion operation of the ND filter 9f from the position E02 to the position F02 is performed independently of the light amount adjustment. Thus, the light amount is hardly reduced. The MTF is hardly changed as described later.

The length in the insertion direction of the transparent portion 9f3 corresponds to (is equal to or slightly longer than) the length in the same direction of the stop aperture at F4.0 fully covered with the transparent portion 9f3.

This is because too long a transparent portion 9f3 increases the size of the ND filter 9f, and prevents reduction in size of the light amount adjustment unit 9 including the ND filter 9f or the video camera.

The length in the insertion direction of the transparent portion 9f3 may be shorter than the length in the same direction of the stop aperture at F4.0 if no color change or brightness change is deemed to occur in the picked-up image in the insertion as described above. The length L9f in the insertion direction of the entire ND filter 9f is set to the length corresponding to a diameter φD9 of the full stop aperture.

The ND filter 9f is preferably driven from the position E02 to the position F02 at as high a speed as possible, for example, a maximum speed of the ND filter 9f driven by the ND motor 9c as the actuator. However, the speed may be not much lower than an image capturing speed (time required for capturing one field image: for example, 60 fields/second) from the image-pickup element 15 that converts an optical image formed by light having passed through the stop aperture into an electrical signal in the video camera. Specifically, the speed may be of a level at which degradation of MTF is inconspicuous.

For example, the ND filter 9f is preferably moved between the position E02 and the position F02 at a speed of ½ second or lower.

The ND filter 9f is more preferably moved between the position E02 and the position F02 at a speed of ¼ second or lower that is time required for capturing fifteen field images.

Even when the tip 9f4 of the ND filter 9f is controlled so as not to be halted in the stop aperture at F4.0 in any stop operation, the stop aperture at F4.0 is fully covered with the transparent portion 9f3, and thus a rapid brightness change (a brightness shock) does not occur in the camera system. If a rapid brightness change is not recognized in the camera system, the transmittance of the transparent portion 9f3 may be lower than 100%.

Further, if a rapid brightness change is not recognized in the camera system, part of the gradated density portion 9f2 may cover part of the stop aperture at F4.0, instead of fully covering the stop aperture at F4.0 with only the transparent portion 9f3. In this case, the transparent portion 9f3 and part of the gradated density portion 9f2 correspond to the first part, and the other part of the gradated density portion 9f2 and the maximum density portion 9f1 correspond to the second part having lower transmittance than the first part.

However, the movement of the ND filter 9f between the position E02 and the position F02 may be halted for a moment within a range of preventing degradation of the MTF in the camera system.

Then, the ND filter 9f is driven to a position (the position G02) at which the maximum density portion 9f1 and the gradated density portion 9f2 fully cover the stop aperture at F4.0. Then, with the ND filter 9f halted, the area of the stop aperture is again reduced to reduce the transmitted light amount (the positions H02 and I02). Small aperture diffraction causes degradation of the MTF from the position G02 to the position I02.

A detailed method for controlling the tip 9f4 of the ND filter 9f so as to be moved in the stop aperture (F4.0) without a halt in any stop operation will be described with reference to FIGS. 7 and 8.

Figure 7:
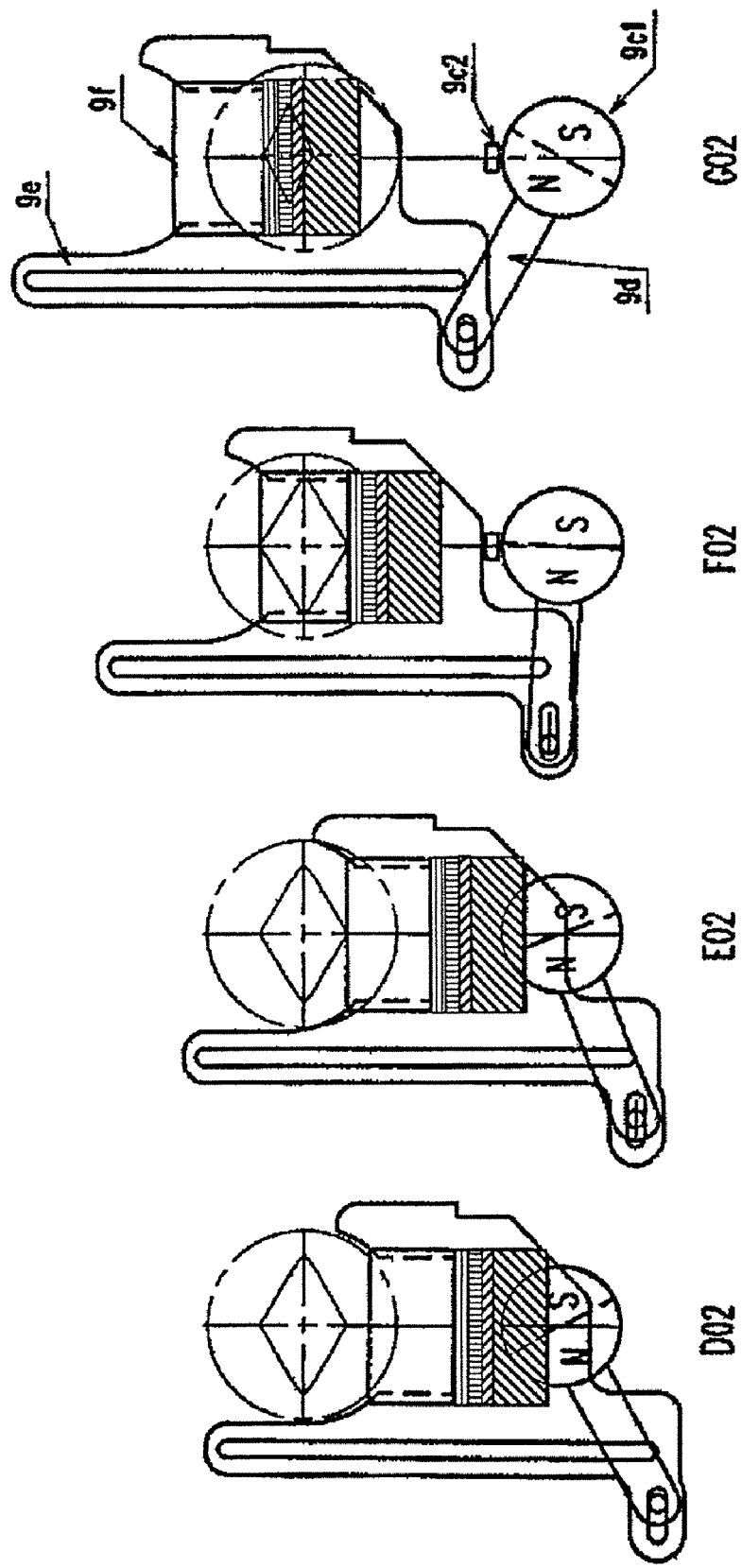
FIG. 7 is a front view of a method of detecting a position of an ND filter in the light amount adjustment unit of Embodiment 1.

As shown in FIG. 7, a driving magnet 9c1 is placed in the ND motor 9c, and connected to the ND driving arm 9d. The ND filter 9f mounted to the ND holding plate 9e is moved by rotation of the magnet 9c1.

In order to detect the rotation angle of the magnet 9c1, a magnetic sensor 9c2 is placed near a magnetization boundary between the north pole and the south pole of the magnet 9c1. A hall element or the like may be used as the magnetic sensor 9c2.

Figure 8:
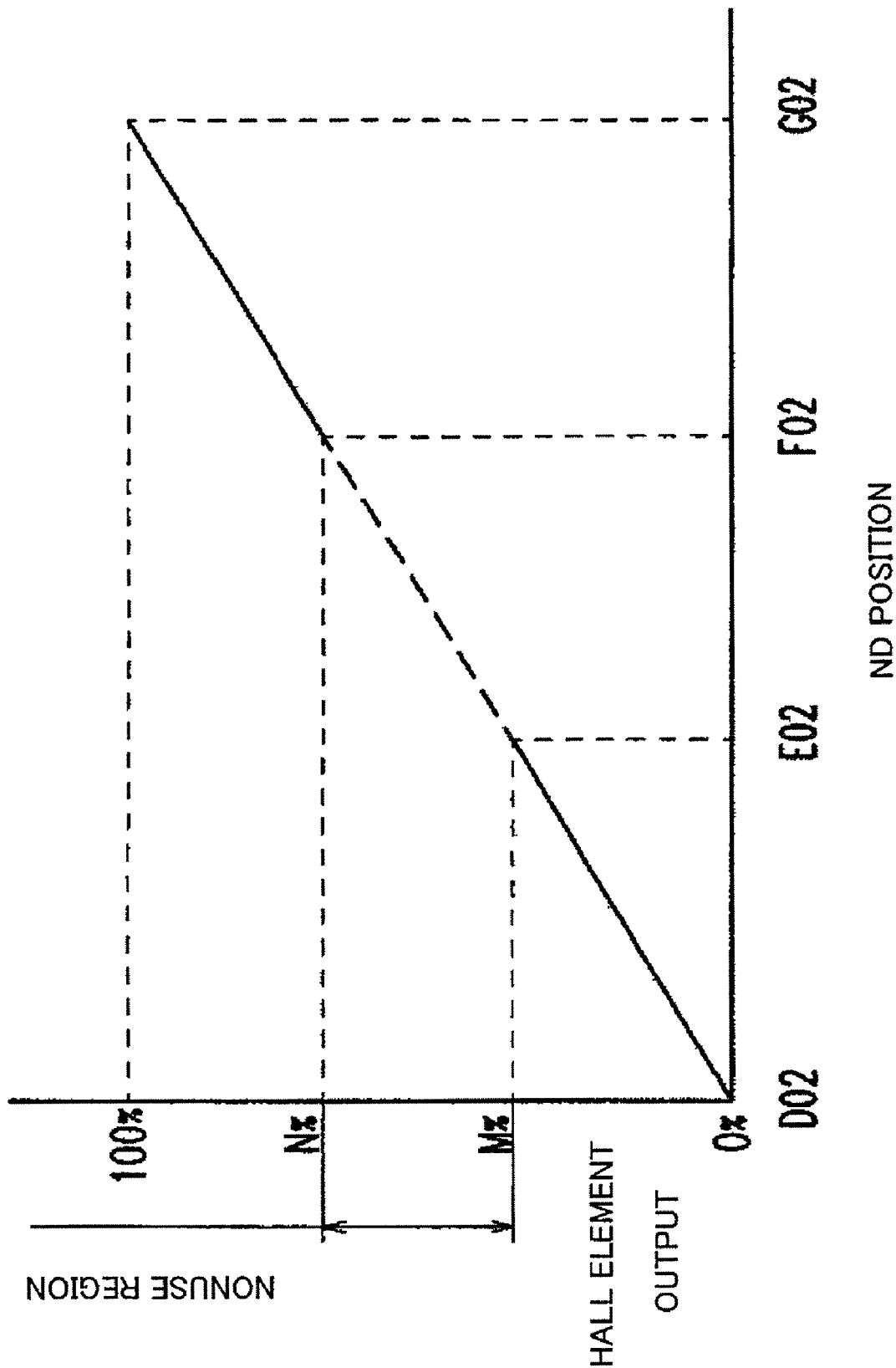
FIG. 8 is a graph showing a relationship between the position of the ND filter and an output of a magnetic sensor in Embodiment 1.

The rotation angle of the magnet 9c1 and an output value of the magnetic sensor 9c2 have linear relationship, and thus as shown in FIG. 8, the position of the ND filter 9f and the output of the magnetic sensor 9c2 also have linear relationship.

The output of the magnetic sensor 9c2 is M % at the position E02 immediately before the tip 9f4 of the ND filter 9f covers part of the stop aperture at F4.0 formed by the stop blade 9a. The output of the magnetic sensor 9c2 is N (>M) % at the position F02 where the stop aperture at F4.0 is fully covered with the transparent portion 9f3 (or the transparent portion 9f3 and part of the gradated density portion 9f2) of the ND filter 9f. In this case, the control to move the ND filter 9f in the stop aperture at F4.0 so that the tip 9f4 of the ND filter 9f is not halted in any stop operation is control such that a range where an output A of the magnetic sensor 9c2 is M %<A<N % is a nonuse range. Actually, the relationship between the output of the magnetic sensor 9c2 and the position of the ND filter 9f is changed according to mounting errors of the ND filter 9, and thus a range of (M−α) %<A< (N+α) % is preferably a nonuse range in view of a margin α.

Figure 9:
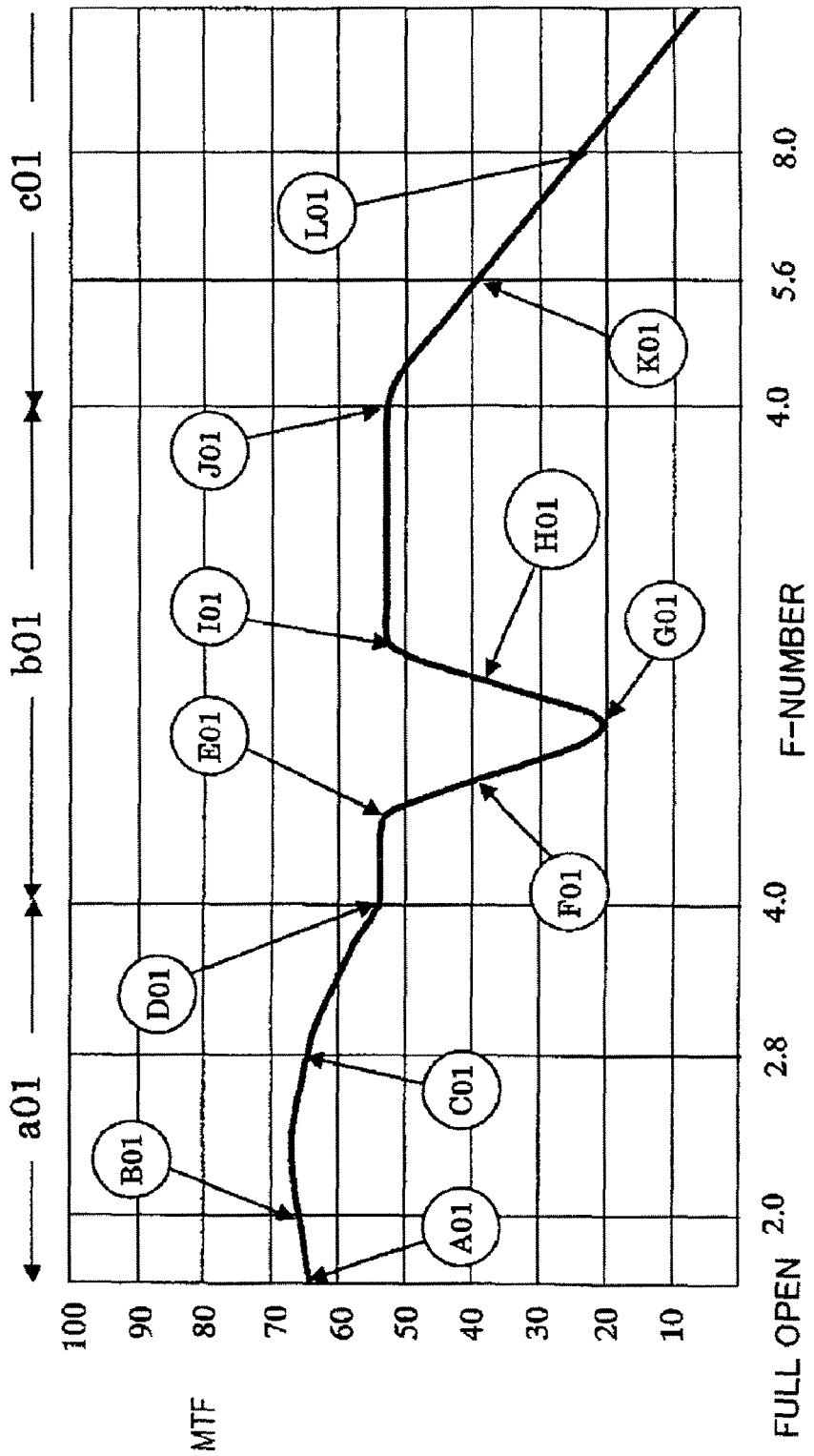
FIG. 9 is a graph showing a relationship between light amount adjustment and MTF by a conventional light amount adjustment unit.
Figure 10:
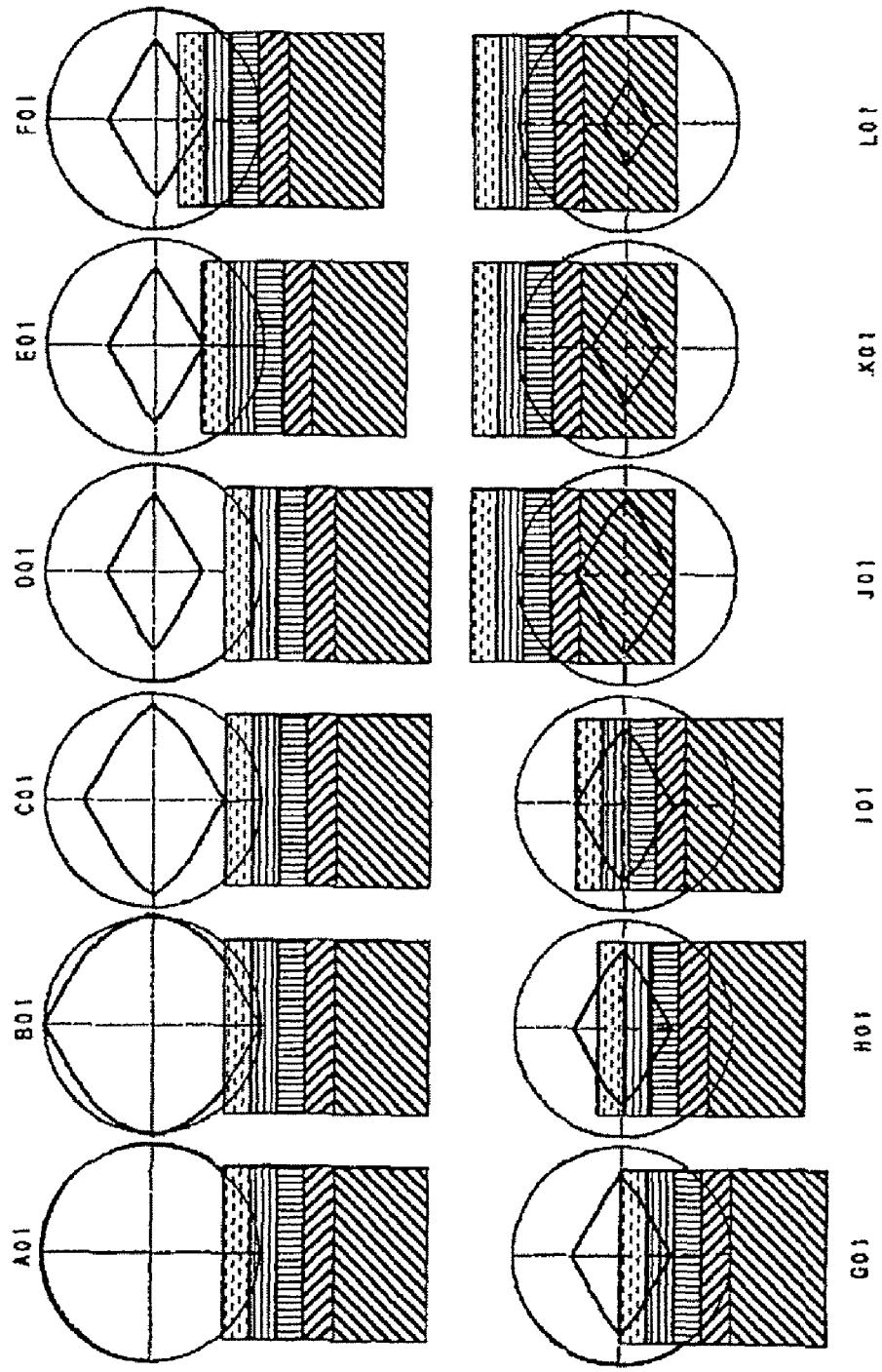
FIG. 10 is a front view of a state of the conventional light amount adjustment unit in each operation position.

FIG. 9 shows a relationship between a transmitted light amount and MTF of a lens barrel portion in a conventional light amount adjustment unit. FIG. 10 shows that a stop aperture and an insertion state of an ND filter are controlled so as to reduce the transmitted light amount in the conventional light amount adjustment unit in the order of positions A01 to L01. The operation positions A01, B01, . . . , L01 in FIG. 10 correspond to the states denoted by the same reference numerals on the graph in FIG. 9. The ND filter in FIG. 10 is not provided with a transparent portion, but is provided with a gradated density portion and a maximum density portion from its tip.

The stop aperture is narrowed from the position A01 in an open state to the position B01 at F2.0 to increase the MTF. If the stop aperture is further narrowed to the position C01 at F2.8 and the position D01 at F4.0, the MTF is gradually reduced (the range a01 in FIG. 9).

The ND filter is inserted into the stop aperture from the position E01 immediately before the tip of the ND filter covers part of the stop aperture at F4.0 to reduce the light amount (the range b01 in FIG. 9). In the positions F01 to H01 where the tip of the ND filter covers part of the stop aperture at F4.0, diffraction by a small uncovered opening surrounded by the tip of the ND filter and an edge of the stop aperture and a difference in optical path length corresponding to a thickness of a board of the ND filter cause degradation of the MTF.

Specifically, the degradation of the MTF is started at the position E01, and reaches maximum at the position G01 where the tip of the ND filter passes through the center of the stop aperture (the center of an optical axis of an image-pickup optical system). Then, the degradation of the MTF is continued until the position I01 where the ND filter fully covers the stop aperture at F4.0. Next, the stop aperture at F4.0 is fully covered with the maximum density portion at the position J01, and then the stop aperture is again narrowed at the positions K01 and L01 (the range c01 in FIG. 9). During this time, small aperture diffraction causes the degradation of the MTF.

Though allowable degradation of the MTF is changed according to pixel pitches of an image-pickup element, it is supposed that an allowable MTF in this video camera is 40%. In this case, in the configuration and the control method of the conventional light amount adjustment unit, degradation of images is recognized at the position F01 to the position H01 and the position K01 and thereafter.

On the other hand, in the configuration and the control method of the light amount adjustment unit in this embodiment, degradation of images is not recognized until the position H02.

In the conventional ND filter, no transparent portion is provided, and thus even if the tip of the ND filter is driven from the position E01 to the position I01 at high speed so as not to be halted in the stop aperture in any stop operation, attenuation of the light amount occurs in the gradated density portion and a rapid brightness change is conspicuous.

Specifically, in the embodiment, the transparent portion 9f3 is provided on the tip side of the ND filter 9f, and the ND filter 9f (the ND motor 9c) is controlled to be moved so that the tip of the ND filter is not halted in the narrowed stop aperture smaller than the full stop aperture in any stop operation. This can suppress a rapid brightness change and degradation of the MTF.

In the embodiment, the case has been described where the ND filter 9f is inserted and driven after the stop aperture reaches the size corresponding to F4.0, but the ND filter may be inserted and driven after the stop aperture reaches the size corresponding to a different aperture value (for example, F5.6). The ND filter is inserted at an F-number with a minimum stop aperture or as small a stop aperture as possible within a range allowing degradation of image quality caused by diffraction, thereby reducing the area of the ND filter, which is advantageous for reduction in size of the light amount adjustment unit and the video camera including the unit. Specifically, though the MTF depends on pixel pitches of the image-pickup element as described above, it is preferable that an MTF of 30% of a maximum resolution frequency of the video camera is generally set as a lower limit, and the ND filter is inserted when the F-number reaches a value corresponding to an MTF equal to or higher than the limit.

Figure 11:
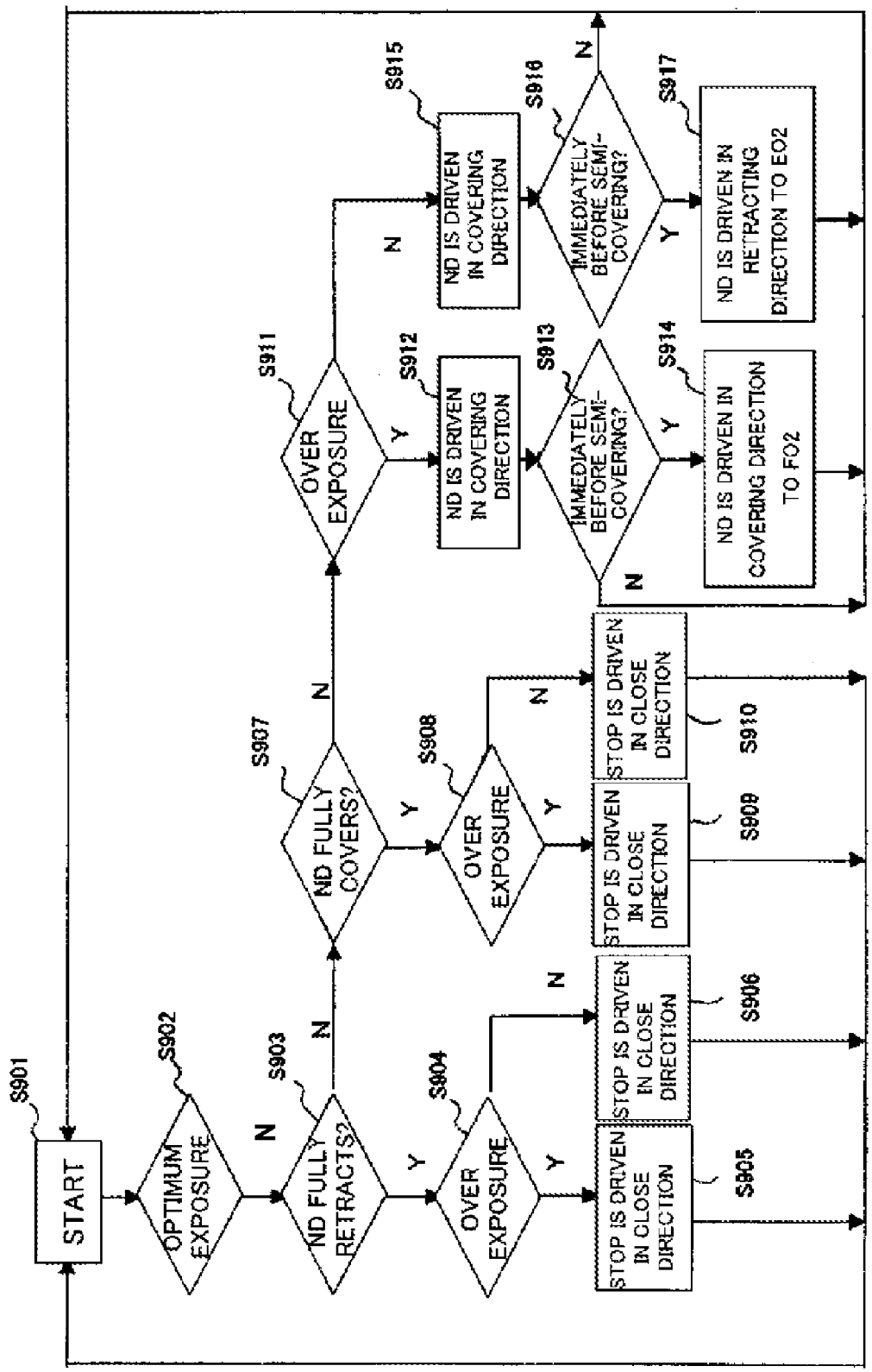
FIG. 11 is a flowchart showing a control sequence of the light amount adjustment unit in the video camera of Embodiment 1.

Next, a control sequence of the light amount adjustment unit in the embodiment will be described with reference to FIG. 11. The flowchart in FIG. 11 shows a sequence of light amount feedback control depending on changes in brightness of an object executed by the CPU 37 according to a computer program. In FIG. 11, character "Y" denotes "Yes", "N" denotes "No", and "S" denotes "Step".

First in Step 902, the CPU 37 determines whether or not an optimum exposure state with respect to the current brightness of the object is obtained based on an average value (a photometric value) of a Y signal output from the AE gate 39 in FIG. 3.

Figure 6:
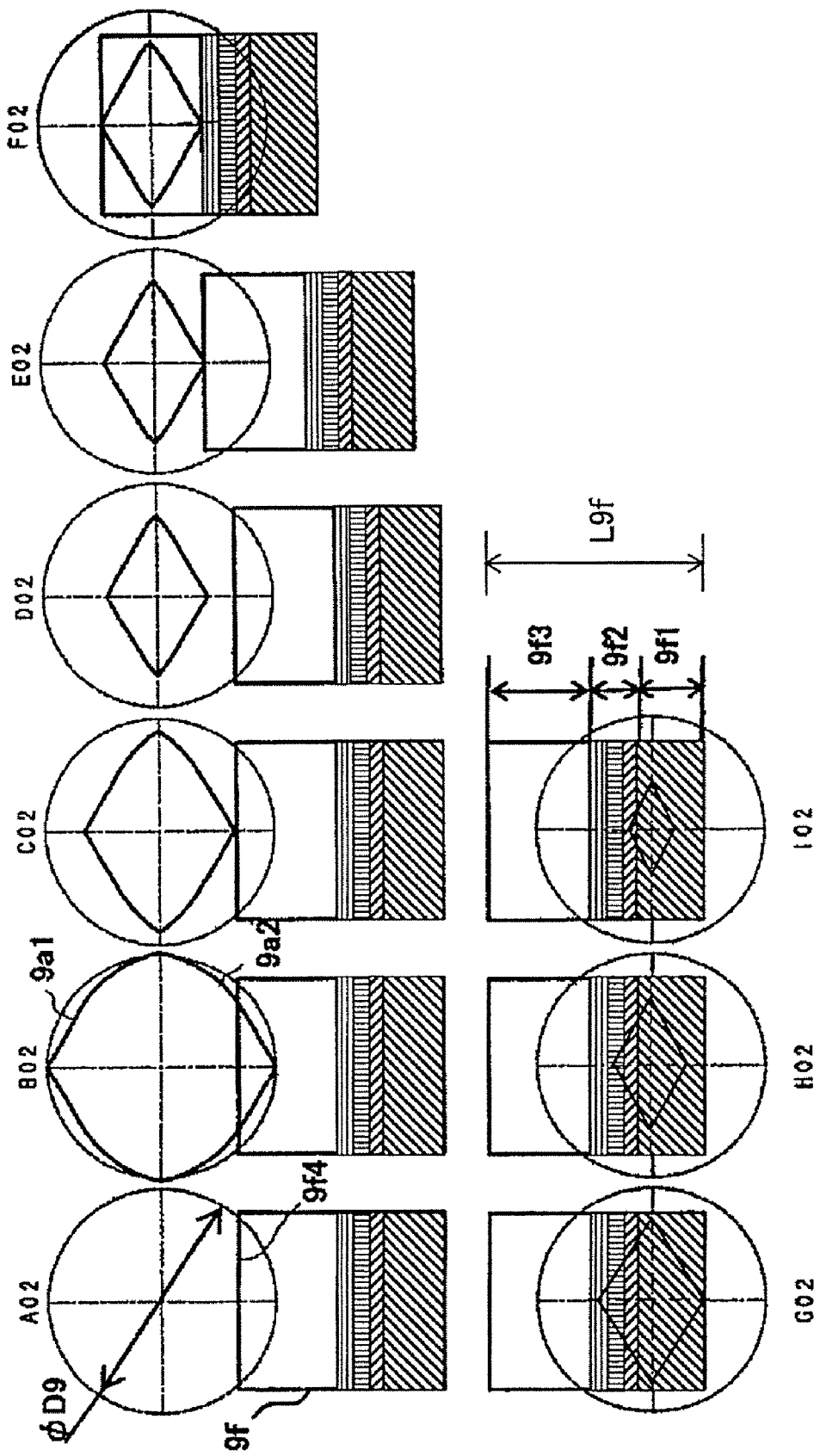
FIG. 6 is a front view of a state of the light amount adjustment unit of Embodiment 1 in each operation position.

Next, in Step 903, the CPU 37 determines whether or not the ND filter 9f is in a retracted position (the positions A02 to D02 in FIG. 6). When the ND filter 9f is in the retracted position, exposure is controlled only by driving of the stop blade 9a, and thus it is determined in Step 904 whether overexposure or underexposure is caused. When it is determined that the overexposure is caused, the stop motor 9b is controlled to move the stop blade 9a in the closing direction in Step 905, and then it is determined again in Step 902 whether or not optimum exposure is obtained. When it is determined in Step 904 that the underexposure is caused, the stop motor 9b is controlled to move the stop blade 9a in the opening direction in Step 906, and then it is determined in Step 902 whether or not optimum exposure is obtained.

In Step 903, when the ND filter 9f is not in the retracted position, it is determined in Step 907 whether or not the ND filter 9f is in a full covering position (the positions G02 to I02 in FIG. 6). Also when the ND filter 9f is in the full covering position, the exposure control is performed by opening and closing the aperture stop, and thus it is determined in Step 908 whether overexposure or underexposure is caused. When it is determined that the overexposure is caused, the stop motor 9b is controlled so that the stop blade 9a is moved in the closing direction in Step 909. When it is determined that the underexposure is caused, the stop motor 9b is controlled so that the stop blade 9a is moved in the opening direction in Step 910. Then, it is determined again in Step 902 whether or not optimum exposure is obtained.

When the ND filter 9f is not in the full covering position in Step 907, it is determined in Step 911 whether overexposure or underexposure is caused. When the overexposure is caused, the ND motor 9c is controlled so as to move the ND filter 9f in a covering direction (an insertion direction) in Step 912. At this time, in order to control the tip 9f4 of the ND filter 9f so as not to be halted in the stop aperture at F4.0 in any stop operation, it is determined in Step 913 whether or not the tip 9f4 of the ND filter 9a is in a state immediately before covering part of the stop aperture at F4.0 (a state immediately before semi-covering in the insertion direction). This state corresponds to the position E02 in FIG. 6. When the tip 9f4 of the ND filter 9a is in the state immediately before semi-covering in the insertion direction, the ND motor 9c is controlled in Step 914 so as to move the ND filter 9f to the position F02 in FIG. 6 at high speed without a halt in any stop operation.

On the other hand, when the underexposure is caused in Step 911, the ND motor 9c is controlled to move the ND filter 9f in the retracting direction in Step 915. At this time, in order to control the tip 9f4 of the ND filter 9f so as not to be halted in the stop aperture at F4.0 in any stop operation, it is determined in Step 916 whether or not the tip 9f4 of the ND filter 9a is in a state immediately before covering part of the stop aperture at F4.0 (a state immediately before semi-covering in the retracting direction). This state corresponds to the position F02 in FIG. 6. When the tip 9f4 of the ND filter 9a is in the state immediately before semi-covering in the retracting direction, the ND motor 9c is controlled in Step 917 so as to move the ND filter 9f at high speed to the position E02 in FIG. 6 without a halt in any stop operation.

Embodiment 2

In the video camera of Embodiment 1, a control method of the light amount adjustment unit when brightness of the object is changed will be described as Embodiment 2.

As described above, when exposure control corresponding to the brightness of the object is performed using the light amount adjustment unit 9, the light amount transmitting the light amount adjustment unit 9 is controlled by a combination of changing the area of the stop aperture and changing the insertion state of the ND filter 9f. At this time, for example in FIGS. 5 and 6, when the brightness of the object is such that proper exposure is obtained when the stop aperture at F4.0 is set, the problem described below may occur. Specifically, the brightness of the object is repeatedly slightly reduced or increased from the brightness corresponding to F4.0, insertion and retraction of the ND filter 9f at high speed is repeated to cause so-called hunting.

Thus, in the embodiment, brightness of an object (a photometric value) when an ND filter 9f is inserted, and brightness of the object (a photometric value) when the ND filter 9f is retracted are made different. This prevents hunting described above.

However, optimum exposure for the brightness of the object cannot be obtained simply by making different the brightness of the object when the ND filter 9f is inserted and the brightness of the object when the ND filter 9f is retracted, with the size of the stop aperture fixed at F4.0.

Thus, in the embodiment, the size of the stop aperture when the ND filter 9f is inserted and the size of the stop aperture when the ND filter 9f is retracted are made different to obtain optimum exposure for the brightness of the object. The control method thereof will be now described with reference to FIGS. 12 and 13.

Figure 12:
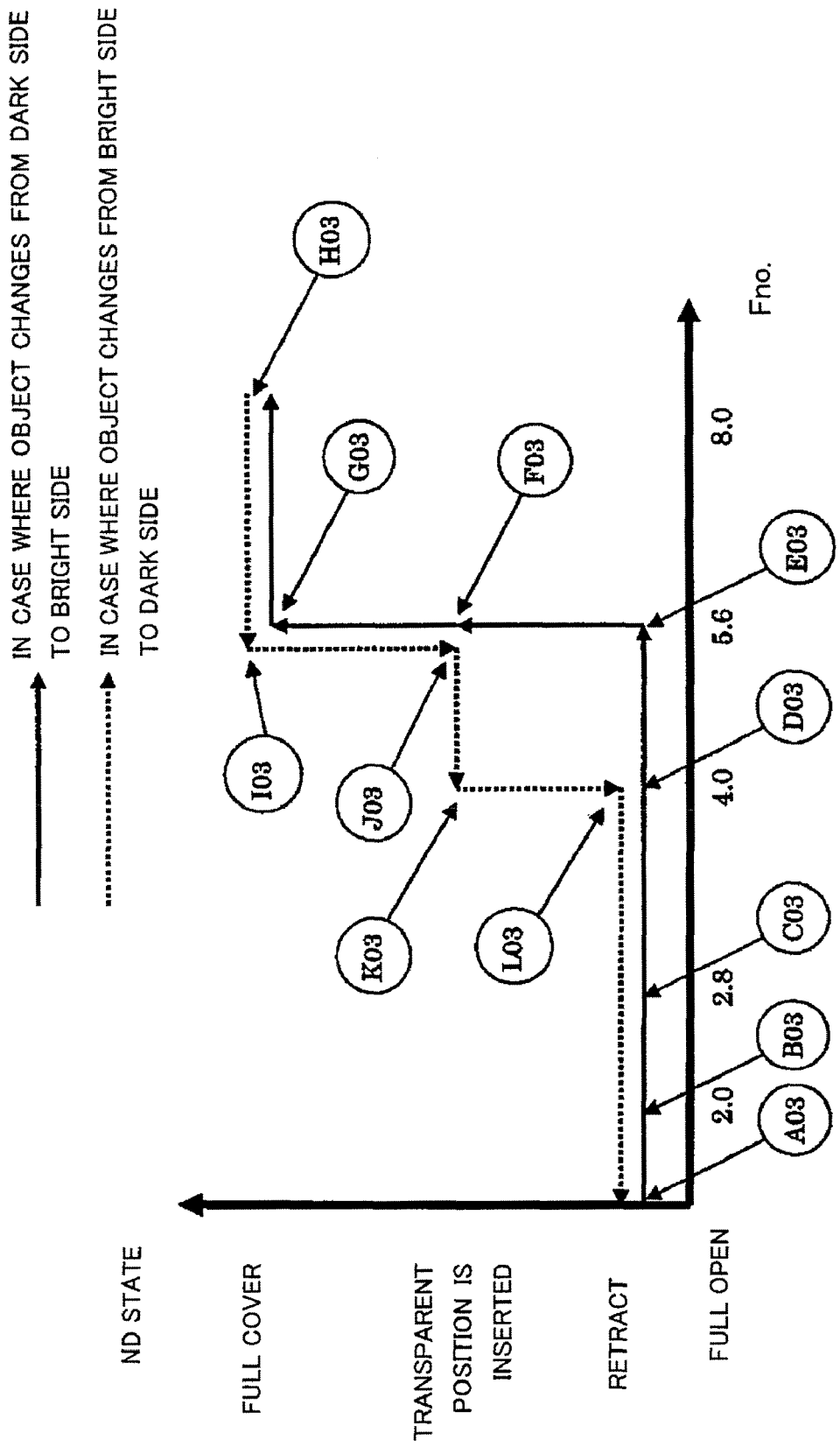
FIG. 12 is an operation chart showing a control method of a light amount adjustment unit in a video camera that is Embodiment 2 of the present invention.
Figure 13:
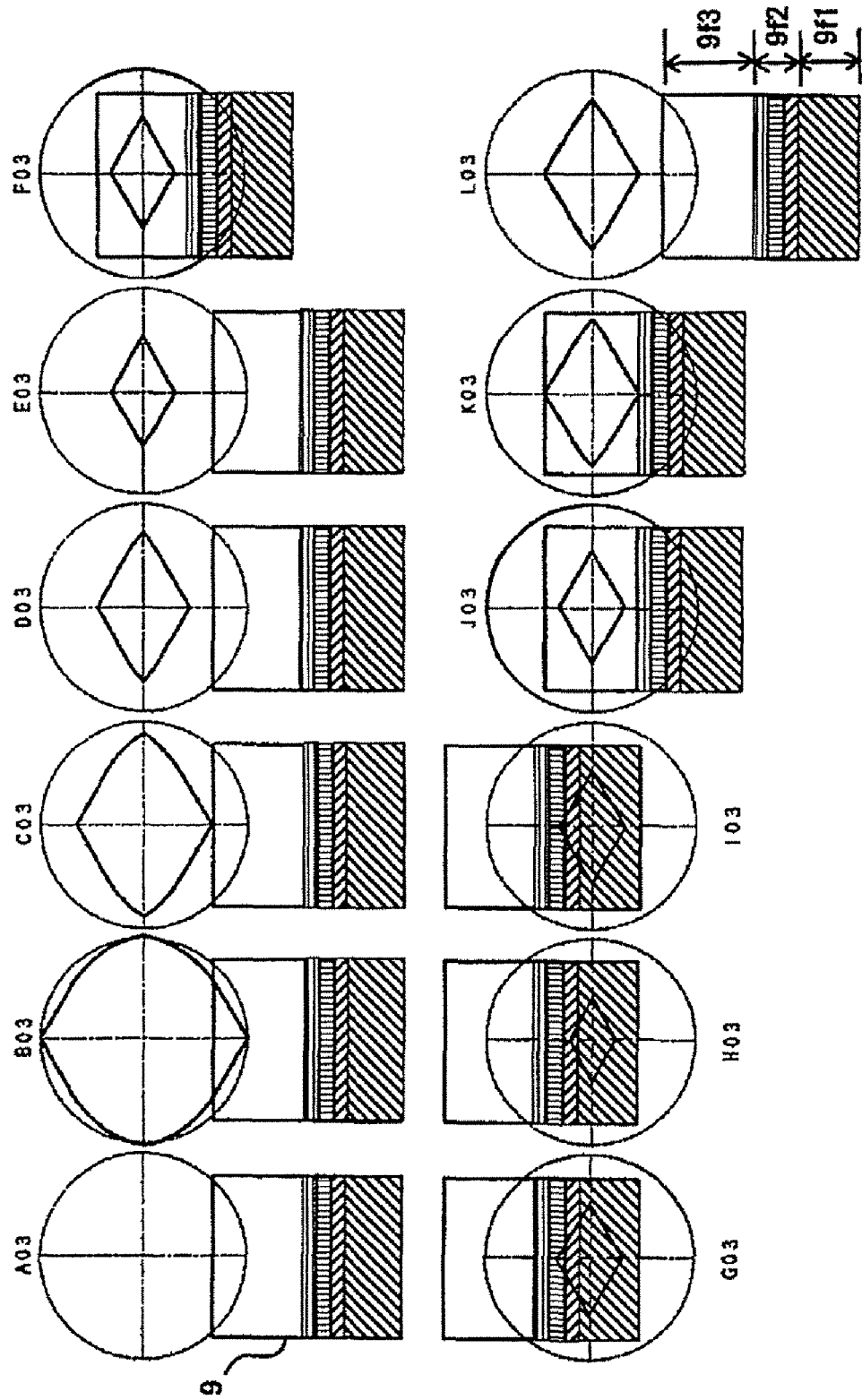
FIG. 13 is a front view of a state of the light amount adjustment unit in each operation position in FIG. 12.

FIGS. 12 and 13 show a relationship between changes in the size of the stop aperture when the brightness of the object changes, and insertion and retraction states of the ND filter 9f. The solid arrow in FIG. 12 indicates a control method of the stop blade 9a and the ND filter 9f when the object changes from a dark side to a bright side. The dotted arrow indicates a control method of the stop blade 9a and the ND filter 9f when the object changes from the bright side to the dark side.

When the object changes from the dark side to the bright side, the stop aperture is first narrowed to control optimum exposure until F5.6 (positions A03 to E03 in FIG. 13). Then, the ND filter 9f is inserted at high speed so that the tip 9f4 of the ND filter 9f is not halted in the stop aperture corresponding to F5.6, that is, does not enter a semi-covering state (the position F03) in any stop operation. Further, the ND filter 9f is then moved in a density increasing direction to perform optimum exposure control.

After the ND filter 9f is moved to the full covering position where the stop aperture at F5.6 is fully covered with the maximum density portion 9f1 and the gradated density portion 9f2 (the position G03), the stop aperture is again narrowed to perform exposure control (the position H03).

On the other hand, when the object changes from the bright side to the dark side, the above described operations from the position F03 to the position H03 are reversed from the position H03 to the position J03 where the transparent portion 9f3 of the ND filter 9f covers the stop aperture at F5.6. Then, if the object becomes darker, the ND filter 9f is not moved in the retracting direction, but the stop aperture is first widened to ensure optimum exposure. Then, if the optimum exposure is not still obtained even if the stop aperture is widened to F4.0 (the position K03), the ND filter 9f is retracted (the position L03). Also at this time, the ND filter 9f is retracted at high speed so that the tip 9f4 of the ND filter 9f is not halted in the stop aperture at F4.0 in any stop operation.

Thus, in the embodiment, the brightness of the object (the first photometric value) when the ND filter 9f is inserted and the brightness of the object (the second photometric value) when the ND filter 9f is retracted are made different. Further, if the brightness of the object changes between the first photometric value and the second photometric value in a state in which the transparent portion 9f3 of the ND filter 9f fully covers the stop aperture (a transparent portion insertion state), the size of the stop aperture is changed. This prevents hunting in which insertion and retraction of the ND filter 9f is repeated.

In the embodiment, the case has been described where the stop aperture when the ND filter 9f is inserted is F5.6, and the stop aperture when the ND filter 9f is retracted is F4.0, but the F-number can be freely selected.

Embodiment 3

In order to prevent hunting of the ND filter 9f described in Embodiment 2, a method other than Embodiment 2 may be employed.

Specifically, when the brightness of the object changes between the first photometric value and the second photometric value in the transparent portion insertion state, a shutter speed in electronic shutter control of the image-pickup element 15 may be changed to prevent hunting and obtain proper exposure.

For example, an electronic shutter speed is set to $\frac{1}{250}$ second according to the brightness of the object (the first photometric value) and the stop aperture (F5.6) when the ND filter 9f is inserted. An electronic shutter speed is set to $\frac{1}{125}$ second according to the brightness of the object (the second photometric value) and the stop aperture (F4.0) when the ND filter 9f is retracted. When the photometric value changes between the first photometric value and the second photometric value in the transparent portion insertion state, the electronic shutter speed is changed between $\frac{1}{250}$ second and $\frac{1}{125}$ second without retracting the ND filter 9f. This can prevent hunting and obtain proper exposure.

The method of preventing hunting by changing the stop aperture in Embodiment 2 and the method by changing the electronic shutter speed in this embodiment may be used in combination.

Embodiment 4

Figure 14:
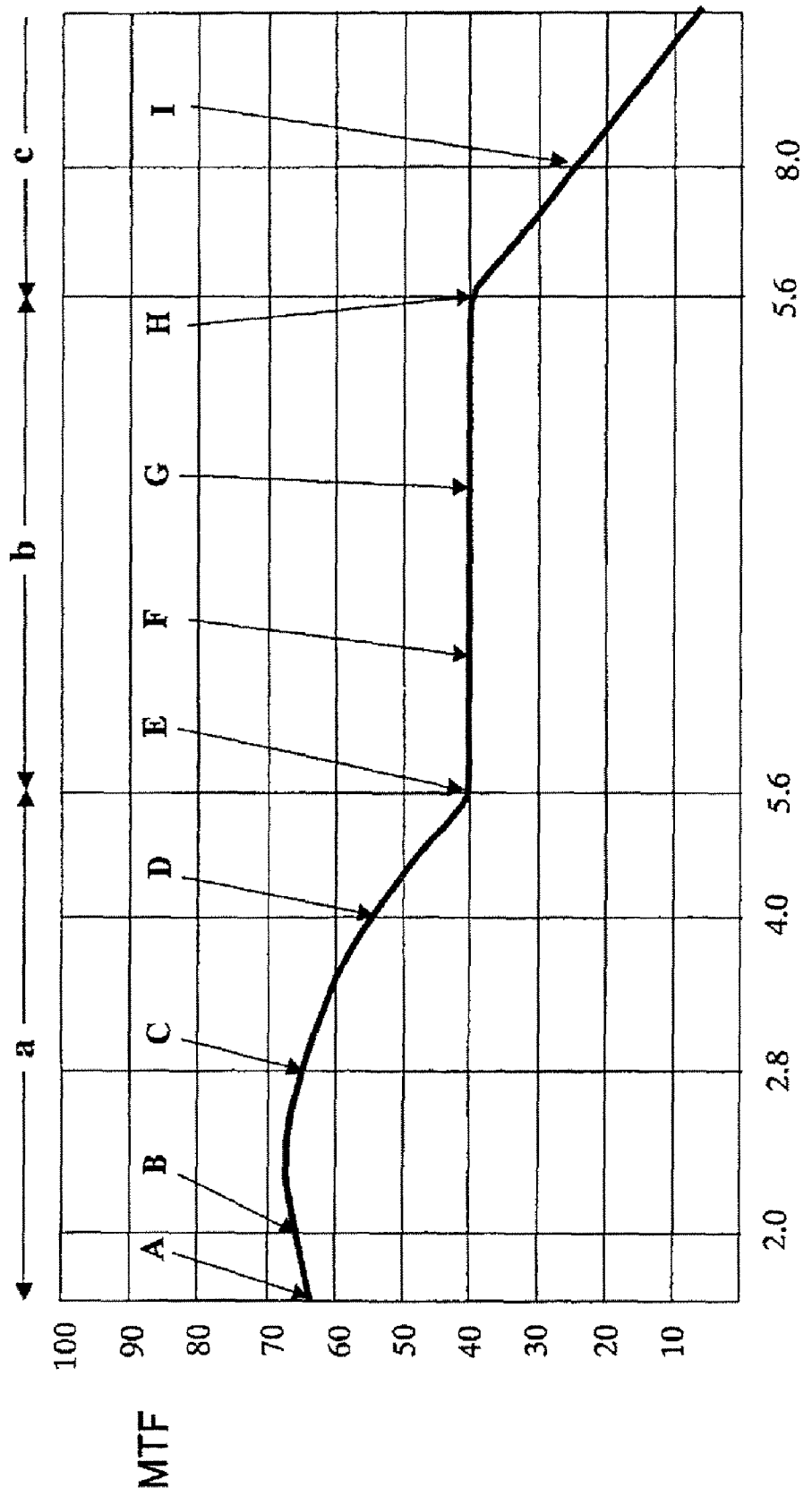
FIG. 14 is a graph showing a relationship between light amount adjustment and MTF by a light amount adjustment unit that is Embodiment 4 of the present invention.

Now, a control method of a light amount adjustment unit 9 (a light amount adjustment device) that is Embodiment 4 of the present invention will be described with reference to FIG. 14. FIG. 14 shows a relationship between a transmitted light amount (T-number) of the light amount adjustment unit 9 and MTF of a lens barrel portion in this embodiment. In the embodiment, a stop aperture for insertion and retraction of an ND filter 9f is a stop aperture corresponding to F5.6. FIG. 14 shows that the stop aperture and an insertion state of the ND filter 9f are controlled so as to reduce a transmitted light amount of the light amount adjustment unit 9 in the order of positions A to I in the embodiment. The position A is a full open state, and the area of the stop aperture is reduced to reduce the light amount from the position A to the position E corresponding to F5.6. From the position A to the position E, the MTF is once increased from the position A and then reduced. The MTF is 40% at the position E where the MTF is the lowest among the position A to the position E, and degradation of image quality is not recognized, which has no problem in normal use.

In the position E, driving of the stop blade 9a is halted, and then a transparent portion 9/3 of the ND filter 9f is inserted in a short time irrespective of light amount control. Thus, as described in Embodiment 1, degradation of the MTF can be prevented between positions where the degradation of the MTF caused by a thickness step (a difference in optical path length) of a ND filter has conventionally been a problem. A flat MTF value can be ensured between the positions.

In the position F, the insertion of the ND filter 9f advances from the position E, and a gradated density portion 9/2 is inserted to a middle position of the stop aperture at F5.6. In this state, the transparent portion 9/3 fully covers the tip portion from the middle position. This can prevent degradation of the MTF caused by the thickness step of the ND filter 9f.

Also in the positions G to H where the insertion of the ND filter 9f further advances, degradation of the MTF is not caused by a difference in density in the gradated density portion 9/2 and a maximum density portion 9/1, thereby allowing light amount control to be performed by the ND filter 9f without degradation of image quality.

Thus, the light amount control can be performed without degradation of the MTF (degradation to a value lower than 40% or 30%) in question from the position A in the full open state to the position H where the maximum density portion 9/1 fully covers the stop aperture at F5.6.

Embodiment 5

Figure 15:
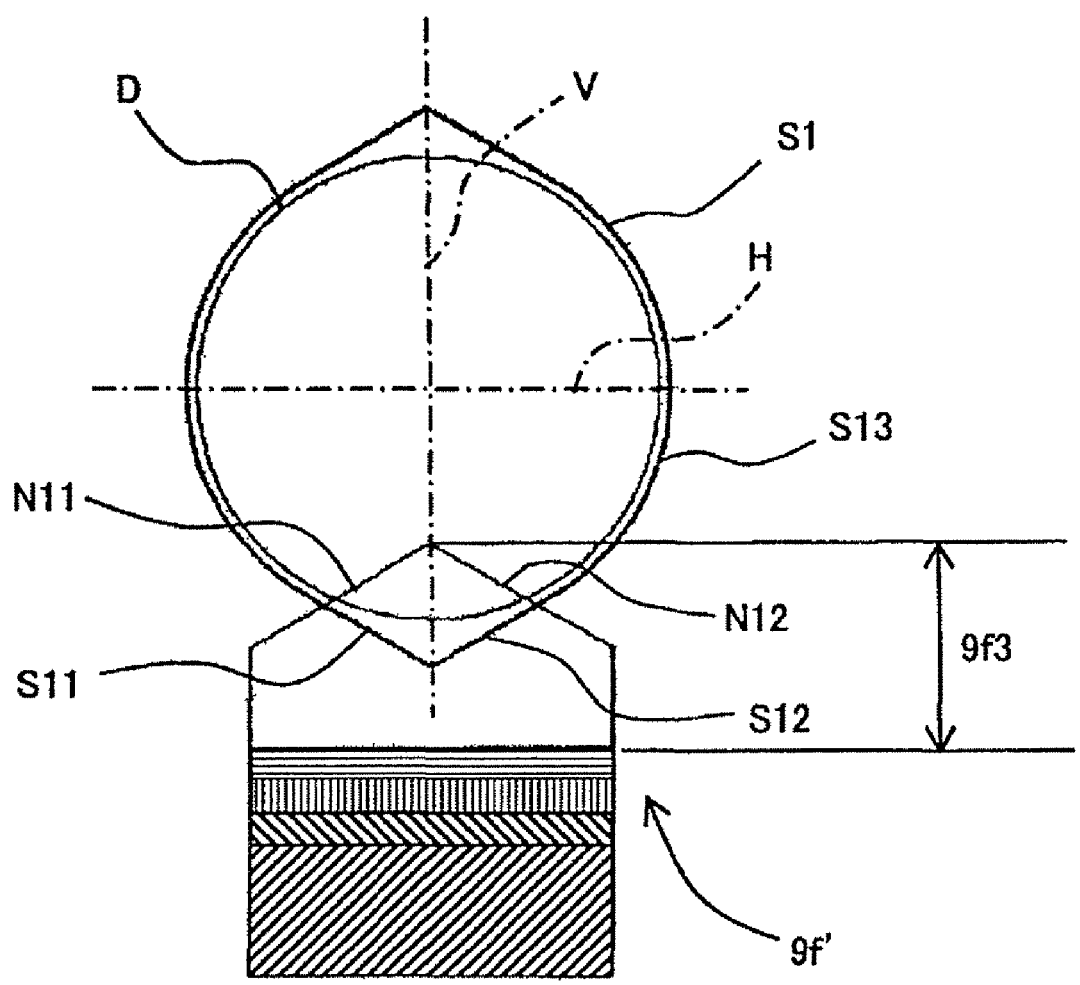
FIG. 15 is a schematic front view of a light amount adjustment unit that is Embodiment 5 of the present invention.

FIG. 15 shows a schematic configuration of a light amount adjustment unit that is Embodiment 5 of the present invention. In the light amount adjustment unit of the embodiment, the configuration of a stop mechanism is the same as that in Embodiment 1, but the shape of an ND filter is different from that in Embodiment 1.

Figure 16:
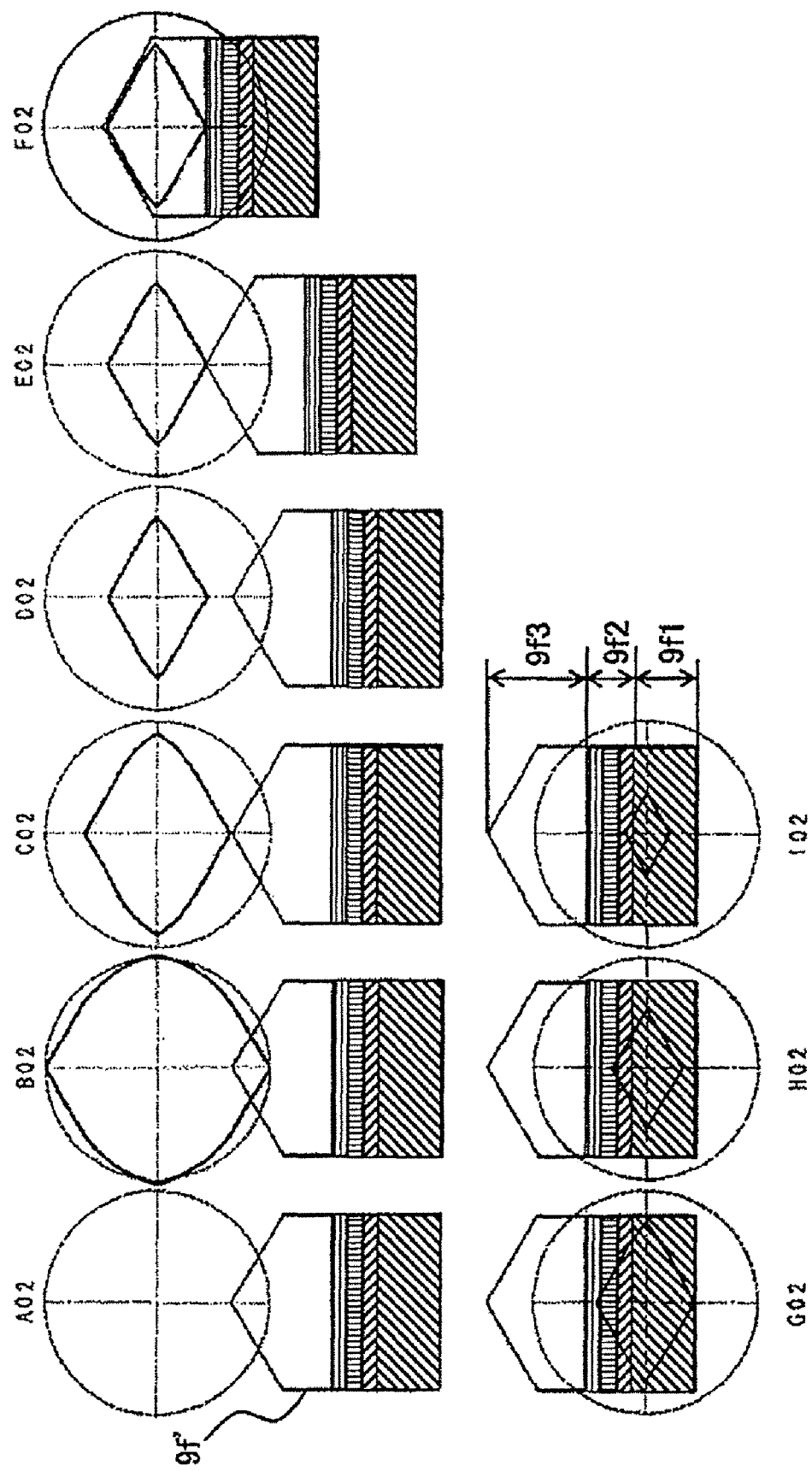
FIG. 16 is a front view of a state of the light amount adjustment unit of Embodiment 5 in each operation position.

FIG. 16 shows a state of the light amount adjustment unit of the embodiment in each operation position. States in the operation positions A02 to I02 are basically the same as those in Embodiment 1. However, due to a difference in shape of the ND filter from Embodiment 1, part of a stop aperture covered with a tip portion of the ND filter in the positions A02 and B02 is different from that in Embodiment 1. A control method of the light amount adjustment unit is the same as that in Embodiment 1.

In FIGS. 15 and 16, reference numeral 9f denotes a gradation ND filter with a transparent portion. As in Embodiment 1, the ND filter 9f has a transparent portion 9/3, a gradated density portion 9/2, and a maximum density portion 9/1 in the order from a tip in an insertion direction into an optical path. Also in the embodiment, the transparent portion 9/3 corresponds to a first part, and the gradated density portion 9/2 and the maximum density portion 9/1 correspond to a second part having lower transmittance than the first part.

In FIG. 15, reference character D denotes a full open stop aperture (a stationary stop aperture). Reference character S1 denotes an aperture shape formed by two stop blades at the full open stop aperture.

The aperture formed by the stop blades has a shape vertically and laterally symmetric with respect to the center of the stop aperture (an optical axis), and is constituted by linear portions S11 and S12 and an arcuate portion S13. The linear portions S11 and S12 are provided to form an aperture of a polygonal (rhombic) shape as in FIG. 16 when the two stop blades are narrowed, and inclined by the same angle with respect to a vertical plane V passing through the center of the stop aperture. The linear portions S11 and S12 are also inclined by the same angle with respect to a horizontal surface H passing through the center of the stop aperture.

On the other hand, a tip of the transparent portion 9/3 of the ND filter 9f in the insertion direction into the optical path (a first direction) is formed differently from a linear shape extending in parallel with light entrance/emergence surfaces of the ND filter 9f and perpendicularly to the insertion direction (a second direction) unlike Embodiments 1 to 4. Specifically, a central portion in the second direction has a so-called angled shape protruding in the insertion direction from opposite ends. The second direction may be referred to as a direction parallel to a scanning line (that is, a scanning line direction) of the image-pickup element 15 shown in FIGS. 1 and 3.

Reference character N11 and N12 denote linear portions forming the tip, which are inclined by the same angle with respect to the vertical plane V passing through the center of the stop aperture. The linear portions are also inclined by the same angle with respect to the horizontal surface H passing through the center of the stop aperture. A vertex portion at which the linear portions N11 and N12 intersect on the vertical plane protrudes the most in the insertion direction in the tip. As shown in FIG. 15, the central portion including the vertex portion in the tip of the ND filter 9/1 is placed in a region facing the full open stop aperture D (an optical path), and the opposite ends are retracted with respect to the full stop aperture D. The vertex portion may be formed by a curve having a small radius of curvature so that no angle is formed at an intersection between the linear portions N11 and N12.

The linear portions N11 and N12 form a rhombic shape with the linear portions S11 and S12 of the stop blade. Specifically, an angle formed by the linear portions S11 and S12 and an angle formed by the linear portions N11 and N12 are the same. In other words, an angle formed by the linear portions N11 and N12 at the tip of the ND filter 9f with respect to the second direction (the horizontal surface H) is the same as an angle formed by the linear portions S11 and S12 of the stop blade with respect to the second direction. This corresponds to a configuration in which, as shown in the position F02 in FIG. 16, when the rhombic-shaped stop aperture is formed to have an aperture edge inclined with respect to the horizontal surface H, the tip of the ND filter 9f is formed to have the same inclination angle as that of the aperture edge.

"The same" herein refers to a range of difference of 0° to 10°. In the embodiment, the angle formed by the linear portions S11 and S12 and the angle formed by the linear portions N11 and N12 are both set to 120°.

When a high brightness object in the form of a point light source exists in an image-pickup region, the beam of light by diffraction at the linear portions S11 and S12 of the stop blade in the inclination angle direction, and the beam of light of the linear portions N11 and N12 of the ND filter 9f in the inclination angle direction are generated. In the embodiment, however, both the beams of light are generated in the same direction other than the horizontal direction.

This can prevent the beam of light in the vertical direction that is apt to be generated when the tip of the ND filter 9f has a horizontal linear shape as shown in Embodiments 1 to 4. In this embodiment, the beam of light is generated in a direction along the inclination angle direction of the linear portion of the stop blade, and is natural as a generation state of the beam of light in a picked-up image.

In other words, the embodiment can prevent the case where the beam of light is generated in the vertical direction to pick up an unnatural image such as a smear image though a smearless image-pickup element such as a CMOS sensor is used.

In the embodiment, the tip of the ND filter is formed into the angled shape by the combination of the two lines, but the tip may be formed into an arcuate shape, or a shape of a combination of the linear shape and the arcuate shape.

In addition, according to each of the embodiments, the ND filter can be operated so as to prevent a state where the ND filter covers only part of a first aperture (a semi-covering state). This can reliably prevent degradation of image quality caused by the semi-covering state.

According to each of the embodiments, when the second part of the ND filter is inserted into and retracted from the aperture, the first aperture may be covered with the first part, thereby preventing degradation of image quality caused by a difference in optical path length corresponding to the thickness of the ND filter.

Further, that is Embodiment 5, the tip of the ND filter is formed to have a shape different from the linear shape extending in the second direction (parallel to the light entrance/emergence surfaces of the ND filter and perpendicular to the first direction or the scanning direction of the image-pickup element). This can prevent the beam of light in the vertical direction that is apt to be generated when the ND filter has a simple horizontal linear tip shape. This can prevent degradation of image quality by unnatural generation of the beam of light while reducing the size of the light amount adjustment device and thus the optical apparatus.

Preferred embodiments of the present invention have been described, but the present invention is not limited to the embodiments, various variations and changes may be made.

For example, in the embodiments, a lens integrated video camera has been described, but the present invention may be applied to other optical apparatuses such as a lens integrated digital still camera or an interchangeable lens.

Furthermore, the present invention is not limited to these preferred embodiments and various variations and modifications may be made without departing from the scope of the present invention.

This application claims foreign priority benefits based on Japanese Patent Applications Nos. 2006-142514, filed on May 23, 2006 and 2006-174415, filed on Jun. 23, 2006, which are hereby incorporated by reference herein in their entirety as if fully set forth herein.

What is claimed is:

1. An optical apparatus comprising:
an aperture stop having an aperture variable in size;
an ND filter movable with respect to the aperture of the aperture stop, the ND filter having a first part and a second part movable into and out of an optical path defined by the aperture stop, with the first part insertable into the optical path before the second part;
an actuator that drives the ND filter; and
a controller that controls the actuator,
wherein the first part is sized to fully cover a first aperture of the aperture stop, which is narrower than a fully opened aperture thereof, but not fully cover the fully opened aperture,
wherein the first part has a transmittance of 75% or more,
wherein the second part is adjacent to the first part in a movement direction of the ND filter and has a transmittance of less than 75%,
wherein, during video capturing, in any insertion operation of the ND filter from a further retracted position than a first position, which is a position where the first part is retracted with respect to the first aperture, toward a further inserted position than the first position, the controller determines whether the ND filter has reached the first position, and controls the actuator, when the controller determines that the ND filter has reached the first position, to move the ND filter without halting until the ND filter reaches a second position, which is a position where the first part fully covers the first aperture, and
wherein, during video capturing, in any retraction operation of the ND filter from a further inserted position than the second position toward a further retracted position than the second position, the controller determines whether the ND filter has reached the second position, and controls the actuator, when the controller determines that the ND filter has reached the second position, to move the ND filter without halting until the ND filter reaches the first position.

2. The optical apparatus according to claim 1, wherein the controller controls the actuator so as to move the ND filter from the first position to the second position according to a first photometric value, and move the ND filter from the second position to the first position according to a second photometric value different from the first photometric value.

3. The optical apparatus according to claim 2, wherein the controller controls the aperture stop so as to change the size of the aperture when the photometric value changes between the first photometric value and the second photometric value in a state in which the ND filter is located at the second position.

4. The optical apparatus according to claim 2, further comprising:
an image-pickup element that photoelectrically converts an object images,
wherein the controller performs control to change an electronic shutter speed of the image-pickup element when the photometric value changes between the first photometric value and the second photometric value in a state in which the ND filter is located at the second position.

5. The optical apparatus according to claim 1, wherein the controller controls the actuator during video capturing to move the ND filter in ½ seconds or less without halting between the first position and the second position in any stop operation.

6. The optical apparatus according to claim 1, wherein the controller controls the actuator during video capturing to move the ND filter in ¼ seconds or less without halting, between the first position and the second position in any stop operation.

7. An optical apparatus comprising:
an aperture stop having an aperture variable in size;
an ND filter movable with respect to the aperture of the aperture stop;
an actuator that drives the ND filter; and
a controller that controls the actuator,
wherein the ND filter includes a first part that is sized to fully cover a first aperture of the aperture stop, which is narrower than a fully opened aperture thereof, the first part having a transmittance of 75% or more,
wherein, during video capturing, in any insertion operation of the ND filter from a further retracted position than a first position, which is a position where the first part is retracted with respect to the first aperture, toward a further inserted position than the first position, the controller determines whether the ND filter has reached the first position, and controls the actuator, when the controller determines that the ND filter has reached the first position, to move the ND filter without halting until the ND filter reaches a second position, which is a position where the first part fully covers the first aperture, and wherein, during video capturing, in any retraction operation of the ND filter from a further inserted position than the second position toward a further retracted position than the second position, the controller determines whether the ND filter has reached the second position, and controls the actuator, when the controller determines that the ND filter has reached the second position, to move the ND filter without halting until the ND filter reaches the first position.

8. The optical apparatus according to new claim 7, wherein the ND filter further includes a second part adjacent to the first part in a movement direction of the ND filter and has a transmittance of less than 75%.

9. The optical apparatus according to claim 7, wherein the controller controls the actuator during video capturing to move the ND filter in ½ seconds or less without halting between the first position and the second position in any stop operation.

10. The optical apparatus according to claim 7, wherein the controller controls the actuator during video capturing to move the ND filter in ¼ seconds or less without halting, between the first position and the second position in any stop operation.

* * * * *